United States Patent
Akimoto et al.

(10) Patent No.: US 8,743,841 B2
(45) Date of Patent: Jun. 3, 2014

(54) MOBILE STATION APPARATUS AND MOBILE COMMUNICATION METHOD USING RESPECTIVE FEEDBACK SCHEMES FOR TRANSMISSION OF MULTIPLE PRE-CODING INDICATORS

(75) Inventors: Yosuke Akimoto, Osaka (JP); Tatsushi Aiba, Osaka (JP); Seiji Sato, Osaka (JP); Shohei Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/989,365

(22) PCT Filed: Apr. 23, 2009

(86) PCT No.: PCT/JP2009/058038
§ 371 (c)(1),
(2), (4) Date: Oct. 22, 2010

(87) PCT Pub. No.: WO2009/131163
PCT Pub. Date: Oct. 29, 2009

(65) Prior Publication Data
US 2011/0038354 A1     Feb. 17, 2011

(30) Foreign Application Priority Data
Apr. 25, 2008  (JP) .................................. 2008-114730

(51) Int. Cl.
*H04B 7/216* (2006.01)

(52) U.S. Cl.
USPC ........................................................ 370/335

(58) Field of Classification Search
USPC ......... 370/203, 204–215, 229–240, 241–253, 370/310–337, 338–350, 395.1, 395.3, 370/395.4, 395.41, 395.42, 395.5, 395.52, 370/395.53, 412–421, 431–457, 458–463, 370/464–497, 498–529, 523–520
See application file for complete search history.

(56) References Cited

U.S. PATENT DOCUMENTS

| | | | |
|---|---|---|---|
| 6,975,611 B1 * | 12/2005 | Balachandran et al. ...... | 370/337 |
| 7,492,699 B2 * | 2/2009 | Cho ............................. | 370/203 |
| 7,502,597 B2 * | 3/2009 | Murata et al. .................. | 455/95 |
| 7,593,486 B2 * | 9/2009 | Jeong et al. .................... | 375/324 |
| 7,653,026 B2 * | 1/2010 | Obuchi et al. ................. | 370/331 |

(Continued)

FOREIGN PATENT DOCUMENTS

WO  WO 2009/002097 A1  12/2008

OTHER PUBLICATIONS

Ericsson, "MIMO Related DL Control Signalling," R1-074844, 3GPP TSG-RAN WG1 #51, Nov. 5-9, 2007.

(Continued)

*Primary Examiner* — Jung-Jen Liu
(74) *Attorney, Agent, or Firm* — Birch, Stewart, Kolasch & Birch, LLP

(57) ABSTRACT

A mobile station transmits to a base station a plurality of pre-coding indicators using respective feedback schemes of a plurality of kinds of feedback schemes that can be set simultaneously by the base station. The mobile station receives from the base station a downlink signal on which pre-coders corresponding to one of the transmitted pre-coding indicators have been applied, and a pre-coder confirmation representing whether the corresponding pre-coders have been applied. The pre-coders represented by the pre-coder confirmation are associated with one of the plural feedback schemes.

4 Claims, 17 Drawing Sheets

(56) References Cited

U.S. PATENT DOCUMENTS

| | | | |
|---|---|---|---|
| 7,848,279 B2* | 12/2010 | Ranta-aho et al. | 370/328 |
| 7,873,023 B2* | 1/2011 | Ihm et al. | 370/349 |
| 7,889,755 B2* | 2/2011 | Malladi et al. | 370/432 |
| 7,894,390 B2* | 2/2011 | Nakamata et al. | 370/329 |
| 7,941,150 B2* | 5/2011 | Zhang et al. | 455/450 |
| 7,957,450 B2* | 6/2011 | Hansen et al. | 375/130 |
| 2003/0185181 A1* | 10/2003 | Balachandran et al. | 370/337 |
| 2004/0264588 A1* | 12/2004 | Song et al. | 375/260 |
| 2005/0238108 A1* | 10/2005 | Suh et al. | 375/260 |
| 2006/0153060 A1* | 7/2006 | Cho | 370/208 |
| 2007/0086468 A1* | 4/2007 | Hosein et al. | 370/395.4 |
| 2008/0187065 A1* | 8/2008 | Chang et al. | 375/267 |
| 2009/0201825 A1* | 8/2009 | Shen et al. | 370/252 |
| 2009/0238303 A1* | 9/2009 | Mondal et al. | 375/295 |
| 2010/0227615 A1* | 9/2010 | Gaal et al. | 455/436 |
| 2011/0038354 A1* | 2/2011 | Akimoto et al. | 370/335 |

OTHER PUBLICATIONS

Freescale Semiconductor, Inc., "Efficient Method for Feedback Reduction and Feedback Mechanism for Precoded MIMO in EUTRA," R1-063156, 3GPP TSG RAN WG1 #47, Nov. 2006.

Huawei, "Overhead Reduction of UL CQI signalling for E-UTRA DL," R1-063035, 3GPP TSG RAN WG1 #47, Nov. 6, 2006.

Motorola, "PMI Downlink Signaling and Downlink PDCCH Format," R1-073077, 3GPP TSG RAN1 #49bis, Jun. 25-29, 2007.

Sharp, "PMI Synchronization Issues", 3GPP TGS RAN WG1 Meeting #52 bis R1-081244, Shenzhen, China, Mar. 31-Apr. 4, 2008.

* cited by examiner

MOBILE STATION APPARATUS AND MOBILE COMMUNICATION METHOD USING RESPECTIVE FEEDBACK SCHEMES FOR TRANSMISSION OF MULTIPLE PRE-CODING INDICATORS

TECHNICAL FIELD

The present invention relates to a mobile communication system in which a mobile station apparatus measures the reception quality of a signal received from a base station apparatus and transmits reception quality information to the base station apparatus, as well as to a base station apparatus, mobile station apparatus and mobile communication method that are applied to this mobile communication system.

BACKGROUND ART

3GPP (3rd Generation Partnership Project) is a project that studies and makes mobile phone system specifications based on evolved W-CDMA (Wideband-Code Division Multiple Access) and GSM (Global System for Mobile Communications) networks. In 3GPP, the W-CDMA system is standardized as a third-generation cellular mobile communication system, and services have been launched successively. In addition, HSDPA (High-Speed Downlink Packet Access) in which communication speed is further increased is also standardized, and services have been launched. In 3GPP, evolutions in third-generation radio access technology (Evolved Universal Terrestrial Radio Access: hereinafter referred to as E-UTRA) are also being considered.

As a downlink communication system in E-UTRA, the OFDMA (Orthogonal Frequency Multiple Access) system has been proposed, wherein user multiplexing is performed using mutually orthogonal subcarriers. In addition, in the OFDMA system, there are applied such techniques as adaptive modulation/demodulation and error correction schemes (AMCS: Adaptive Modulation and Coding Scheme) based on such adaptive radio link control as channel coding, etc. AMCS refers to a scheme in which such radio transmission parameters as the coding rate of error correction, data modulation level, etc., are switched in accordance with the channel propagation state of each mobile station apparatus in order to perform high-speed packet data transmission efficiently. For example, with respect to data modulation, it is possible to increase the maximum throughput of a mobile communication system by switching from QPSK (Quadrature Phase Shift Keying) to multilevel modulation schemes with higher modulation efficiency such as 16-QAM (Quadrature Amplitude Modulation), 64-QAM, etc., as the propagation channel state improves. The combination of modulation scheme and coding rate is referred to as MCS (Modulation and Coding Scheme).

In OFDMA, an available domain for a communication can be divided in the frequency and time domain that physically correspond to subcarriers. A group of divided domains put together is called a resource block, one or several resource block(s) is/are assigned to each mobile station apparatus, and communications are performed wherein a plurality of mobile station apparatus are multiplexed.

In order for the base station apparatus and each of the mobile station apparatus to perform communications with optimal quality and speed in accordance with the requirement, it is necessary to determine the assignment of resource blocks and the transmission schemes considering the reception quality for each subcarrier of each mobile station apparatus. Since only the transmission scheme and scheduling can be determined by the base station apparatus, and since, in frequency division duplex (FDD) the condition of the downlink channel propagation shall be measured by the corresponding mobile station apparatus, it is necessary for each mobile station apparatus to feed back reception quality to the base station apparatus in order to meet these requirement.

In addition, in E-UTRA, the use of SM (Spatial Multiplexing) techniques that utilize MIMO (Multiple Input Multiple Output) and of such transmit diversities as SFBC (Space-Frequency Block Diversity), etc., has been proposed in order to increase channel capacity. By using MIMO, it becomes possible to form a plurality of channel propagation spaces by multipath effects, to multiplex and transmit a plurality of information, and to combine the power of a plurality of transmit antennas on the receiver side and attain reception gain. The above will herein be collectively referred to as MIMO. In E-UTRA, the use of SM and transmit diversity based on MIMO in the downlink is assumed, and with which scheme communications are to be performed is determined taking into account the state of channel propagation between the base station apparatus and the mobile station apparatus. With respect to the use of MIMO SM, in order to make it easier to perform a separating process on the plurality of spatially multiplexed sequences transmitted from the antennas, pre-coding of the transmit signal sequences in advance at the base station apparatus is considered. Since the pre-coding information for transmit signals cannot also be calculated at the base station apparatus, each mobile station apparatus must feed back transmit signal pre-coding information to the base station apparatus.

The above mentioned reception quality information is information corresponding to the optimum MCS for reception and demodulation at the mobile station apparatus, and the base station apparatus determines, based thereon, the modulation scheme and coding rate for the downlink signal. Further, since this value varies depending on the pre-coding sequence for the transmit signals, the reception quality information is fed back tied to the pre-coding information for transmit signals. The reception quality information and the pre-coding information for transmit signals will herein be referred to collectively as feedback information.

Regarding methods (hereinafter referred to as "modes") for transmitting such feedback information, several modes are being considered for E-UTRA. Broadly classified, they are classification by channel (PUSCH, PUCCH), classification by frequency of transmission (transmitting only once, or transmitting a plurality of times), classification by frequency granularity of the transmitted information, and so forth.

<Classification by Channel>

With respect to channels that use feedback information, it is possible to use a plurality of channels with differing physical properties, and as candidates for such channels, the use of PUCCH (Physical Uplink Control Channel) and PUSCH (Physical Uplink Shared Channel) is being considered for E-UTRA. PUCCH is a channel that is designed mainly for the purpose of transmitting such control information as ACK/NACK (positive acknowledge, negative acknowledge), etc. In E-UTRA, this is designed with a capacity of approximately 20 bits. In addition, PUCCH is designed so as to have favorable properties with respect to interference and be highly reliable by using code spreading and so forth. PUSCH is a channel that is designed mainly for the purpose of transmitting data. Depending on the size of the assigned resources, it is possible to transmit information on the order of 100 bits, and it is also possible to change the modulation scheme and coding rate in accordance with the propagation channel by AMCS. With respect to feedback of reception quality information and transmit signal pre-coding information, it is assumed that PUCCH is to be used in transmitting coarse information and that PUSCH is to be used in transmitting finer information. Thus, in accordance with the availability of resources, etc., channels that suit the characteristics thereof are used.

<Classification by Frequency of Transmission>

Since reception quality information and transmit signal pre-coding information are determined depending on the conditions of the propagation channel, it is preferable that they are transmitted periodically from the mobile station apparatus to the base station apparatus in accordance with variations in the channel propagation. Further, it is also preferable from the view point of reducing overhead that resources for transmitting such information be assigned in a single operation from the base station apparatus. In this operation, a mode in which a plurality of persistent resources are assigned from that timing is referred to as periodic assignment.

On the other hand, when periodic resources are not assigned, or when the feedback information obtained in this mode is insufficient in terms of a flexible frequency scheduling, etc., there are cases where one might wish to request feedback at a certain timing. With respect thereto, the base station apparatus is able to request the mobile station apparatus to transmit reception quality information and transmit signal pre-coding information just once using specified resources. A mode in which reception quality information and transmit signal pre-coding information are fed back using the resources assigned in this operation is referred to as aperiodic assignment.

<Classification by Frequency Granularity>

It is preferable also in terms of improving characteristics that the modulation scheme and pre-coding to be applied to the downlink signals be applied per subcarrier in OFDM, that is, per smallest unit of the processing system. However, when the granularity of that calculation is too fine, the amount of information to be transmitted from the mobile station apparatus to the base station apparatus becomes too large, thus possibly cause a shortage in resources. Further, there is a strong correlation between the conditions of propagation channels of neighboring subcarriers, and it would thus be a waste of resources to provide feedback for all subcarriers. As such, it would be effective in reducing overhead to group a certain number of consecutive subcarriers or resource blocks together (this will be referred to as "sub-band"), and to feed back one information in relation thereto. In E-UTRA, as methods for realizing the above, various feedback modes are being considered such as, with respect to a group of sub-bands that are limited by the base station apparatus:

(1) feeding back one reception quality information (this will be referred to as "wideband reception quality information") and one transmit signal pre-coding information (this will be referred to as "wideband transmit signal pre-coding information") that are applicable to all of them;

(2) feeding back one reception quality information and transmit signal pre-coding information that are applicable to several sub-bands that are selected by the mobile station apparatus, and position information for those sub-bands;

(3) transmitting one reception quality information and transmit signal pre-coding information with respect to each of the sub-bands; and so forth.

It is also possible to use these three, (from (1) to (3), in any given combination. The reception quality information and transmit signal pre-coding information that are fed back thereby are characteristic in that their characteristics improve the fewer the sub-bands covered thereby are, since their values become more specific to those frequency bands.

By using the above-mentioned (1) to (3) in appropriate combinations, the base station apparatus is able to obtain reception quality information and transmit signal pre-coding information that are optimal for downlink communications. Methods for feeding back reception quality information and transmit signal pre-coding information as defined in terms of combinations of the above-mentioned classifications, etc., are herein referred to as feedback modes. The base station apparatus takes such feedback information into consideration, performs pre-coding on the downlink data signal, and transmits it to the mobile station apparatus while applying a modulation scheme and coding rate in accordance with the reception quality information. In so doing, the mobile station apparatus is unable to properly demodulate the downlink data unless it knows the specific pre-coding that was applied. Therefore, the pre-coding information that was applied on the downlink data signal is transmitted in the control information that is simultaneously transmitted with this downlink data.

If one transmit signal pre-coding information were to be transmitted for every sub-band, there would be a problem in that the number of required transmit signal pre-coding information would be different depending on the number of sub-bands assigned to downlink. Consequently, the format of the downlink control information would be of a variable size, making the mechanism for identifying the format thereof at the mobile station apparatus complicated. Further, there is a problem in that the number of bits required for reporting the transmit signal pre-coding information would increase depending on the number of resource blocks assigned to downlink, thereby increasing overhead for the channel for transmitting downlink control information.

In order to solve the problems above, it has been proposed that the base station apparatus transmit information that represents the fact that pre-coding for the downlink signal has been performed using the most recently signaled pre-coding information that has been fed back from the mobile station apparatus (this will hereinafter be referred to as "transmit signal pre-coder confirmation") by including it in the downlink control information (see Non-Patent Document 1 below). This information can be expressed in one bit and is capable of solving both the problem of format complication and the problem of increased bits, which proved problematic in explicitly including transmit signal pre-coding information in the downlink control information. Further, when using this scheme, if an error were to occur while feeding back transmit signal pre-coding information, there would be a problem in that the transmit signal pre-coding information represented by the transmit signal pre-coder confirmation would differ between the base station apparatus and the mobile station apparatus. In order to avoid this, it has been proposed that error detection information is added to the transmit signal pre-coding information, and when the base station apparatus detect an error, a pre-defined pre-coding between the mobile station apparatus and the base station apparatus is applied.

Further, for purposes of flexibility in the event of an error during feedback of transmit signal sequence number information, it has been proposed that one transmit signal pre-coding information can be transmitted in the downlink control information. In so doing, since the mobile station apparatus is able to use any given transmit signal pre-coding information, it is possible to achieve a flexible downlink communication in downlink (see Non-Patent Document 2 below).

Non-Patent Document 1: "PMI Downlink Signaling and Downlink PDCCH Format", 3GPP TSG RAN WG1 #49bis, R1-073077

Non-Patent Document 2: "MIMO Related DL Control Signalling", 3GPP TSG-RAN WG1 #51, R1-074844

DISCLOSURE OF THE INVENTION

Problems to be Solved by the Invention

However, in such background art as those discussed above, since the most recently fed back transmit signal pre-coding information is always valid, it is not always appropriate to use recently fed back reception quality information and transmit signal pre-coding information in circumstances where there exist a plurality of transmit signal pre-coding information feedback modes or in cases where the information to be reported is divided over a plurality of sub-frames and transmitted. This will be explained with reference to FIG. 11 to FIG. 14.

FIG. 13 and FIG. 14 show two feedback modes (mode 1 and mode 2) that are used simultaneously in this example. Here, it is assumed that the number of sub-bands available to the system is ten (from 1 to 10), and sub-bands 3 to 8 are configured as a target of feedback by the base station apparatus. Further, the reception quality information and transmit signal pre-coding information are described as feedback information.

FIG. 13 shows a feedback mode that uses PUCCH, and it is possible to transmit wideband reception quality information, wideband transmit signal pre-coding information (1301), as well as several sub-band reception quality information, sub-band transmit signal pre-coding information, and position information for those selected sub-bands. Sub-band reception quality information and sub-band transmit signal pre-coding information refer to reception quality information and transmit signal pre-coding information that are calculated with respect to, of groups in which several consecutive sub-bands are put together (herein referred to as "sub-band groups". 1302-1304), sub-bands that have been arbitrarily selected by the mobile station apparatus. In this example, for purposes of brevity, it is assumed that each sub-band group comprises two sub-bands, that one sub-band thereof is selected by the mobile station apparatus, and that the sub-band reception quality information and the sub-band transmit signal pre-coding information are fed back.

With feedback by PUCCH, all information cannot be transmitted in a single batch due to restrictions on the capacity of transmit bits. Thus, the feedback for wideband (1301) and each sub-band group (sub-band group A 1302, sub-band group B 1303, and sub-band group C 1304) are respectively conducted using different sub-frames. This feedback mode will herein referred to as mode 1.

FIG. 14 is a diagram showing a feedback mode in which information for the respective sub-bands can be transmitted in a single batch on PUSCH. With respect to transmit signal pre-coding information corresponding to the respective sub-bands, as many of them as the number of sub-bands can be transmitted. With respect to reception quality information, one value for the wideband and a value corresponding to the difference value relative to the value of the wideband for each sub-band may be transmitted in order to reduce the bit count. However, since methods relating to making transmission more efficient may be used as desired, discussion will herein be omitted. These are transmitted in a batch in one sub-frame. This feedback mode will herein be referred to as mode 2.

The feedback mode examples shown in FIG. 13 and FIG. 14 assumed, for purposes of brevity, the number of reception quality information corresponding to one sub-band (or wideband) to be one. In contrast, when spatially multiplexing a plurality of sequences through MIMO SM, they may also be applied in cases where a plurality of reception quality information is transmitted for the purpose of respectively applying different MCSs.

FIG. 11 is a diagram showing a sequence with respect to a mobile station apparatus and a base station apparatus in accordance with the above-mentioned Non-Patent Document 1. The downlink signal transmitted with accompanying transmit signal pre-coder confirmation indicates the transmit signal pre-coding information fed back at which point in time it corresponds to. The use of the transmitted/received transmit signal pre-coding information at the base station apparatus and the mobile station apparatus as an interpretation of the transmit signal pre-coder confirmation will herein be referred to as "application to transmit signal pre-coder confirmation" or simply as "application." In FIG. 11, the reference numeral 1110 denotes a table of transmit signal pre-coding information that is managed at the base station apparatus and the mobile station apparatus in order to determine which transmit signal pre-coding information is to be used for which sub-band when the downlink signal is transmitted along with the transmit signal pre-coder confirmation, and it varies in accordance with the feedback information transmission/reception timing. Here, processing delay with respect to the feedback information, etc., are not considered, and there may be a predetermined off-set in the application timing. The letter W with respect to the reference numeral 1110 indicates that the wideband transmit signal pre-coding information transmitted in that sub-frame is to be applied, while the letter S indicates that the sub-band transmit signal pre-coding information is to be applied. Further, the arrows drawn downward therefrom indicate the periods over which the transmit signal pre-coding information is to be applied continuously.

In the example shown in FIG. 11, resources for performing feedback in mode 1 in periods of three sub-frames are granted from sub-frame 1 to sub-frame 16, and feedback using these resources is performed. In addition, in sub-frame 10, feedback in mode 2 is performed. Detailed operations in each sub-frame are described below.

In sub-frame 1, wideband transmit signal pre-coding information is transmitted in mode 1 (1101). In this state, it is assumed that no transmit signal pre-coding information has been transmitted/received in the past, and the received value is applied to the transmit signal pre-coder confirmation in all sub-bands. In sub-frames 4 and 7, transmit signal pre-coding information is respectively transmitted only with respect to sub-bands 3 and 6, and these are applied (1102 and 1103). In sub-frame 8, aperiodic feedback is conducted in mode 2, and sub-band transmit signal pre-coding information is respectively transmitted with respect to sub-bands 3 to 8. Further, all transmit signal pre-coding information overwrites and is applied (1104). In sub-frame 10, transmit signal pre-coding information for sub-band 7 in mode 1 is transmitted, and these are applied (1105).

Next, in sub-frame 13, wideband transmit signal pre-coding information is transmitted in mode 1, but since transmit signal pre-coding information is applied by time priority, it overwrites and is applied to all sub-band transmit signal pre-coding information transmitted/received in sub-frame 8 (1106). Then, in sub-frame 16, transmit signal pre-coding information is respectively transmitted only with respect to sub-band 4, and these are applied (1107).

However, with respect to the processes mentioned above, in the process in sub-frame 13, the wideband transmit signal pre-coding signal transmitted in mode 1 overwrites and is applied to, in accordance with the rule of time priority, all of the sub-band information transmitted in sub-frame 8. The sub-band transmit signal pre-coding information aperiodically transmitted in mode 2 essentially has the purpose of being used in cases where the PUCCH information is insufficient and detailed information is demanded by the base station apparatus. Therefore, operations where such coarse wideband transmit signal pre-coding information as those transmitted on PUCCH would immediately overwrite and be applied to the aperiodically transmitted transmit signal pre-coding information for each of the sub-bands are not desirable.

There was a problem in that when there exist a plurality of modes for transmitting transmit signal pre-coding information through such operations, information whose priority should be high is readily overwritten by information of low priority.

An object of the present invention is to solve the above-mentioned problem of being readily overwritten.

Means for Solving the Problems

According to an aspect of the present invention, there is provided a mobile communication system comprising a base station apparatus and a mobile station apparatus, wherein: the mobile station apparatus transmits feedback information, which comprises transmit signal pre-coding information indicating information for pre-coding a transmit signal, to the base station apparatus based on one of a plurality of kinds of feedback schemes that can be set simultaneously; and the base station apparatus transmits to the mobile station apparatus a downlink signal on which pre-coding has been performed, and transmit signal pre-coder confirmation representing a sequence used for the pre-coding, wherein transmit signal pre-coding information represented by the transmit signal pre-coder confirmation corresponds to what is transmitted by using a portion of the plural feedback schemes.

The above-mentioned configuration is applicable to both a mobile station apparatus and a base station apparatus. With respect to the above-mentioned some scheme, it is preferable that a signal specifying the scheme be reported from the mobile station apparatus to the base station apparatus.

According to another aspect of the present invention, there is provided a mobile communication method for a mobile communication system comprising a base station apparatus and a mobile station apparatus, the communication method comprising: a step in which the mobile station apparatus transmits feedback information, which comprises transmit signal pre-coding information indicating information for pre-coding a transmit signal, to the base station apparatus based on one of a plurality of kinds of feedback schemes that can be set simultaneously; and a step in which the base station apparatus transmits to the mobile station apparatus a downlink signal on which pre-coding has been performed, and transmit signal pre-coder confirmation representing a sequence used for the pre-coding, wherein transmit signal pre-coding information represented by the transmit signal pre-coder confirmation corresponds to what is transmitted using a portion of the plural feedback schemes.

In addition, there is provided a mobile communication system comprising a base station apparatus and a mobile station apparatus, wherein: the mobile station apparatus transmits feedback information, which comprises transmit signal pre-coding information indicating information for pre-coding a transmit signal, to the base station apparatus based on a plurality of kinds of feedback schemes that can be set simultaneously; the base station apparatus performs pre-coding on a downlink signal and transmits this to the mobile station apparatus, and also transmits to the mobile station apparatus transmit signal pre-coder confirmation representing a sequence used for the pre-coding along with the downlink signal; and the transmit signal pre-coder confirmation comprises information representing transmit signal pre-coding information transmitted using which scheme of the plural feedback schemes it corresponds to. The above-mentioned configuration is applicable to both a mobile station apparatus and a base station apparatus.

According to another aspect of the present invention, there is provided a communication method for a mobile communication system comprising a base station apparatus and a mobile station apparatus, the communication method comprising: a step in which the mobile station apparatus transmits feedback information, which comprises transmit signal pre-coding information indicating information for pre-coding a transmit signal, to the base station apparatus based on a plurality of kinds of feedback schemes that can be set simultaneously; and a step in which the base station apparatus performs pre-coding on a downlink signal and transmits this to the mobile station apparatus, and also transmits to the mobile station apparatus transmit signal pre-coder confirmation representing a sequence used for the pre-coding along with the downlink signal, wherein the transmit signal pre-coder confirmation comprises information representing transmit signal pre-coding information transmitted by which scheme of the plurality of feedback schemes it corresponds to.

In addition, there is provided a mobile communication system comprising a base station apparatus and a mobile station apparatus, wherein: the mobile station apparatus transmits to the base station apparatus feedback information comprising transmit signal pre-coding information indicating information for pre-coding a transmit signal, wherein the feedback information is transmitted based on a plurality of kinds of feedback schemes that can be set simultaneously; the base station apparatus performs pre-coding on a downlink signal, transmits this to the mobile station apparatus, and transmits, to the mobile station apparatus and along with the downlink signal, transmit signal pre-coder confirmation representing a sequence used for the pre-coding; and for the sequence used for the pre-coding represented by the transmit signal pre-coder confirmation, that whose priority is highest is employed from among a plurality of transmit signal pre-coding information transmitted from the mobile station apparatus to the base station apparatus, the priority being computed using one or more of: transmitted or received time information; difference in the feedback scheme; and width of a frequency channel that the transmit signal pre-coding information corresponds to. The above-mentioned configuration is applicable to both a mobile station apparatus and a base station apparatus. The above-mentioned priority should preferably be set to lower priority in accordance with the lapse of time from when the concerned transmit signal pre-coding information is transmitted/received. In addition, the sequence that was used for the pre-coding represented by the transmit signal pre-coder confirmation should preferably have its correspondence cancelled after a predetermined time.

According to another aspect of the present invention, there is provided a mobile communication method for a mobile communication system in which a mobile station apparatus measures a reception quality of a signal received from a base station apparatus and transmits reception quality information to the base station apparatus, the communication method comprising: a step in which the mobile station apparatus transmits to the base station apparatus feedback information comprising transmit signal pre-coding information indicating information for pre-coding a transmit signal, wherein the feedback information is transmitted based on a plurality of kinds of feedback schemes that can be set simultaneously; and a step in which the base station apparatus performs pre-coding on a downlink signal, transmits this to the mobile station apparatus, and transmits, to the mobile station apparatus and along with the downlink signal, transmit signal pre-coder confirmation representing a sequence used for the pre-coding, wherein the sequence used for the pre-coding represented by the transmit signal pre-coder confirmation is determined, from among transmit signal pre-coding information transmitted from the mobile station apparatus to the base station apparatus, based on priority that uses one of: transmitted or received time; difference in the feedback scheme; and width of a frequency channel that the transmit signal pre-coding information is applied to.

Effects of the Invention

According to the present invention, with respect to a case in which a plurality of transmit signal pre-coding information transmission modes exist and in which a pre-coding sequence applied to a downlink signal is reported using transmit signal pre-coder confirmation, it is possible to avoid a problem where transmit signal pre-coding information whose priority should be high is immediately overwritten by transmit pre-coding information of low priority.

DESCRIPTION OF SYMBOLS

1 . . . Data control unit, 3 . . . modulation coding unit, 4 . . . transmit signal pre-coding unit, 5 . . . mapping unit, 7 . . . inverse fast Fourier transform (IFFT) unit, 11 . . . radio transmission unit, 15 . . . radio reception unit, 17 . . . fast Fourier transform (FFT) unit, 21 . . . inverse discrete Fourier transform (IDFT) unit, 22 . . . demodulation decoding unit, 23 . . . data extraction unit, 27 . . . transmit information control unit, 28 . . . antenna, 25 . . . scheduler unit, 31 . . .

modulation coding control unit, 33 . . . frequency-selective scheduler unit, 35 . . . transmit signal pre-coding control unit, 36 . . . spatial multiplexing control unit.

BEST MODE FOR CARRYING OUT THE INVENTION

Communication techniques according to embodiments of the present invention are described below with reference to the drawings. It is noted that in the description below, cases will be described where the present invention is realized in a mobile communication system, however, it is by no means limited as such. For example, mobile communication methods, etc., also fall within the scope of the present invention.

First Embodiment

Figure 1:
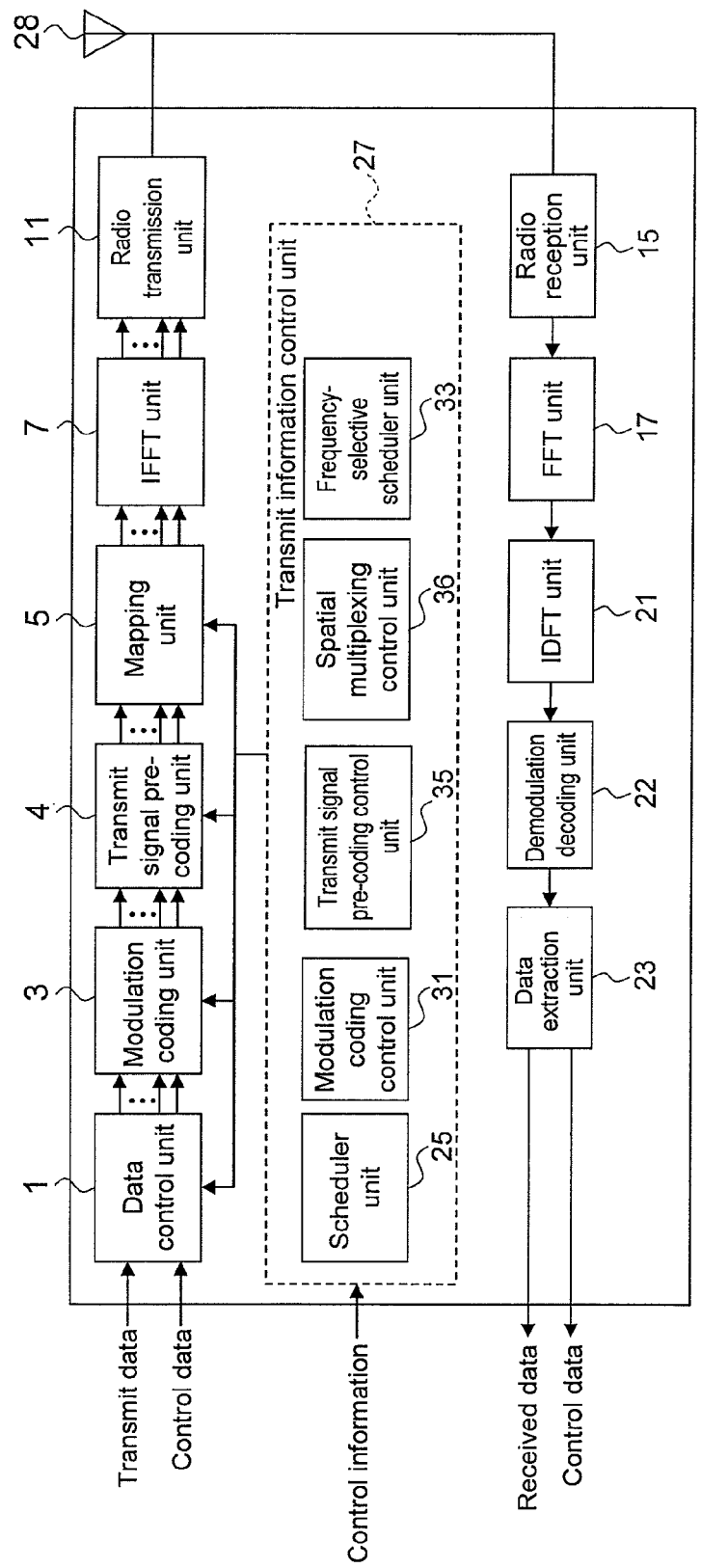
FIG. 1 is a functional block diagram showing one configuration example of a base station apparatus according to an embodiment of the present invention.
Figure 2:
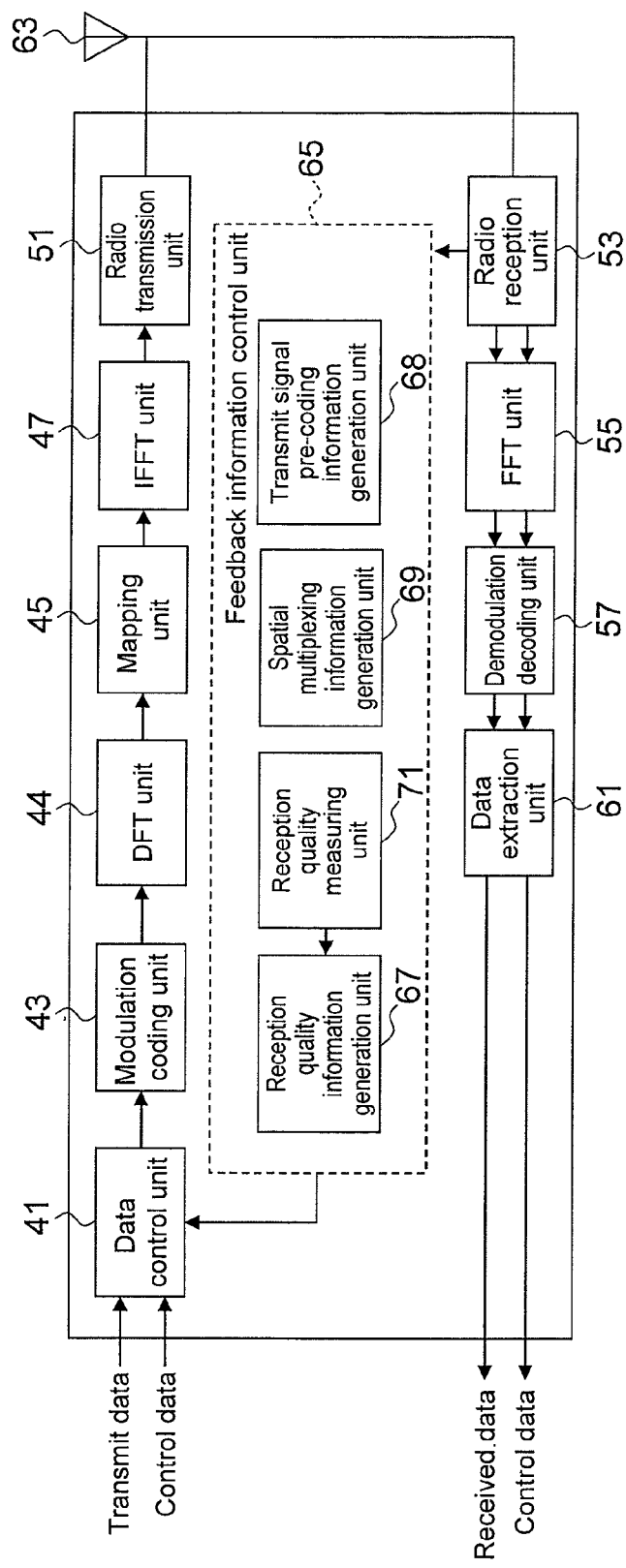
FIG. 2 is a functional block diagram showing one configuration example of a mobile station apparatus according to an embodiment of the present invention.

A mobile communication system according to the first embodiment of the present invention comprises a base station apparatus and a mobile station apparatus. FIG. 1 and FIG. 2 are functional block diagrams respectively showing configuration examples of a base station apparatus and a mobile station apparatus according to the present embodiment. The base station apparatus in FIG. 1 comprises: a data control unit 1; a modulation coding unit 3; a transmit signal pre-coding unit 4; a mapping unit 5; an inverse fast Fourier transform (IFFT) unit 7; a radio transmission unit 11; a radio reception unit 15; a fast Fourier transform (FFT) unit 17; an inverse discrete Fourier transform (IDFT) unit 21; a demodulation decoding unit 22; a data extraction unit 23; a transmit information control unit 27; and antennas 35.

The transmit information control unit 27 comprises: a scheduler unit 25; a modulation coding control unit 31; a frequency-selective scheduler unit 33; a transmit signal pre-coding control unit 35; and a spatial multiplexing control unit 36. The antennas 35 comprise a plurality of antennas required for MIMO/SDM communications.

Transmit data and control data to be transmitted to each mobile station apparatus are inputted to the data control unit 1. The respective data are successively transmitted to the mobile station apparatus in accordance with instructions from the transmit information control unit 27. When MIMO/SM is applied, output data is divided into a plurality of transmit sequences in accordance with information of the spatial multiplexing control unit 36 of the transmit signal.

The modulation coding unit 3 performs a modulation process and an error correcting coding process with respect to the signal inputted from the data control unit 1 based on the modulation scheme and the coding rate according to the transmit information control unit 27, and outputs it to the transmit signal pre-coding unit 4. The transmit signal pre-coding unit 4 processes the signal inputted from the modulation coding unit 3 based on control information that is inputted from the transmit information control unit 27, and outputs it to the mapping unit 5.

The mapping unit 5 maps the data outputted from the modulation coding unit 3 onto each subcarrier based on frequency-selective scheduling information inputted from the transmit information control unit 27, and outputs it to the inverse fast Fourier transform unit 7. The inverse fast Fourier transform unit 7 applies inverse fast Fourier transform on the data outputted from the mapping unit 5 to transform it into a time series signal, and outputs it to the radio transmission unit 11.

The output signal from the inverse fast Fourier transform unit 7 is digital/analog converted at the radio transmission unit 11, and, after being up-converted to a frequency suited for transmission, is transmitted to each mobile station apparatus via the antennas 28.

Based on such control information as the resource region available to each mobile station apparatus, intermittent transmission/reception cycle, format of transmit data channel, buffer status, etc., the scheduler unit 25 schedules for downlink and uplink, while also controling of transmit signal sequence number update. The modulation coding control unit 31 determines the modulation scheme and coding rate to be applied to the data for each mobile station apparatus based on the reception quality information that is transmitted from the mobile station apparatus.

The frequency-selective scheduler unit 33 performs a process of frequency-selective scheduling to be applied to each data based on feedback information that is transmitted from the mobile station apparatus. The spatial multiplexing control unit 36 determines the number of spatially multiplexed sequences for a transmit signal based on such information as spatially multiplexed sequence number information of the transmit signal transmitted from the mobile station apparatus, traffic conditions of the base station apparatus itself, etc. Using the transmit signal pre-coding information transmitted from the mobile station apparatus, the transmit signal pre-coding control unit 35 determines the pre-coding to be applied to the transmit data, while generating the information in order to report to the mobile station apparatus the transmit signal pre-coding that was used.

Using control information that is inputted from an upper layer and control information that is inputted from the data extraction unit 23, the transmit information control unit 27 controls the operations of the scheduler unit 25, the modulation coding control unit 31, the frequency-selective scheduler unit 33, the transmit signal pre-coding control unit 35, and the spatial multiplexing control unit 36. Their respective output information is managed, and control information that is necessary for the operations of the data control unit 1, the modulation coding unit 3, the transmit signal pre-coding unit 4 and the mapping unit 5 is outputted.

After analog/digital converting an SC-FDMA signal received at the antennas 28 and down-converting it to a baseband signal, the radio reception unit 15 outputs it to the fast Fourier transform (FFT) unit 17. The fast Fourier transform unit 17 applies Fourier transform to the received signal per unit of processing time and outputs it to the inverse discrete Fourier transform unit 21. The inverse discrete Fourier transform unit 21 divides the input signal into frequency bands assigned for each mobile station apparatus, performs an inverse Fourier transform process, and outputs to the demodulation decoding unit 22 a signal that reproduces the SC-FDMA signal.

The demodulation decoding unit 22 demodulates and decodes the inputted signal per mobile station apparatus, and outputs it to the data extraction unit 23. At the data extraction unit 23, the input signal from the demodulation decoding unit 22 is divided into information that is necessary for control information generation at the transmit information control unit 27, received data, and control data that is necessary at the higher layer, and outputted.

On the other hand, as shown in FIG. 2, the mobile station apparatus comprises: a data control unit 41; a modulation coding unit 43; a discrete Fourier transform (DFT) unit 44; a mapping unit 45; an inverse fast Fourier transform (IFFT) unit 47; a radio transmission unit 51; a radio reception unit 53; a fast Fourier transform (FFT) unit 55; a demodulation decoding unit 57; a data extraction unit 61; a reception quality information control unit 65; and antennas 63. The feedback information control unit 65 comprises: a reception quality information generation unit 67; a reception quality measuring unit 71; a transmit signal pre-coding information generation unit 68; and a spatial multiplexing information generation unit 69. The antennas 63 comprise a plurality of antennas required for MIMO/SDM communications.

Transmit data to be transmitted to the base station apparatus, control data, and feedback information that is outputted from the feedback information control unit 65 are inputted to the data control unit 41. Each data is successively transmitted to the base station apparatus.

The modulation coding unit 43 performs a modulation process and an error correcting coding process on a signal inputted from the data control unit 41, and outputs each data to the discrete Fourier transform unit 44. The discrete Fourier transform unit 44 applies Fourier transform with respect to a signal inputted from the modulation coding unit 43, generates a signal for performing SC-FDMA, and outputs it to the mapping unit 45. The mapping unit 45 maps the data inputted from the discrete Fourier transform unit 44 onto a frequency resource assigned by the base station apparatus, and outputs it to the inverse fast Fourier transform unit 47.

The inverse fast Fourier transform unit 47 applies inverse fast Fourier transform on a symbol sequence inputted from the mapping unit 45 to convert it into a time-series baseband digital signal, and outputs it to the radio transmission unit 51. The output signal from the inverse fast Fourier transform unit 47 is digital/analog converted at the radio transmission unit 51 and, after up-converting to a frequency for transmission, is transmitted to the base station apparatus via the antennas.

The reception quality measuring unit 71 measures reception quality using a reference signal transmitted from the base station apparatus. Based on information measured by the reception quality measuring unit 71, the reception quality information generation unit 67 generates reception quality information to be transmitted to the base station apparatus. From propagation channel information with respect to the base station apparatus, the transmit signal pre-coding information generation unit 68 generates information on the pre-coding to be performed for the transmit signals at the base station apparatus. The spatial multiplexing information generation unit 69 calculates channel propagation using a signal received from the base station apparatus, and manages the number of transmit sequences that are abailable for the base station apparatus in MIMO/SM.

The feedback information control unit 65 manages the control signals generated by the reception quality information generation unit 67, the transmit signal pre-coding information generation unit 68, and the spatial multiplexing information generation unit 69, and outputs them to the data control unit 41. The feedback information managed at the feedback information control unit 65 is by no means limited to the generation and control of the signals mentioned herein, and may also include units for managing other kinds of feedback information.

Figure 3:
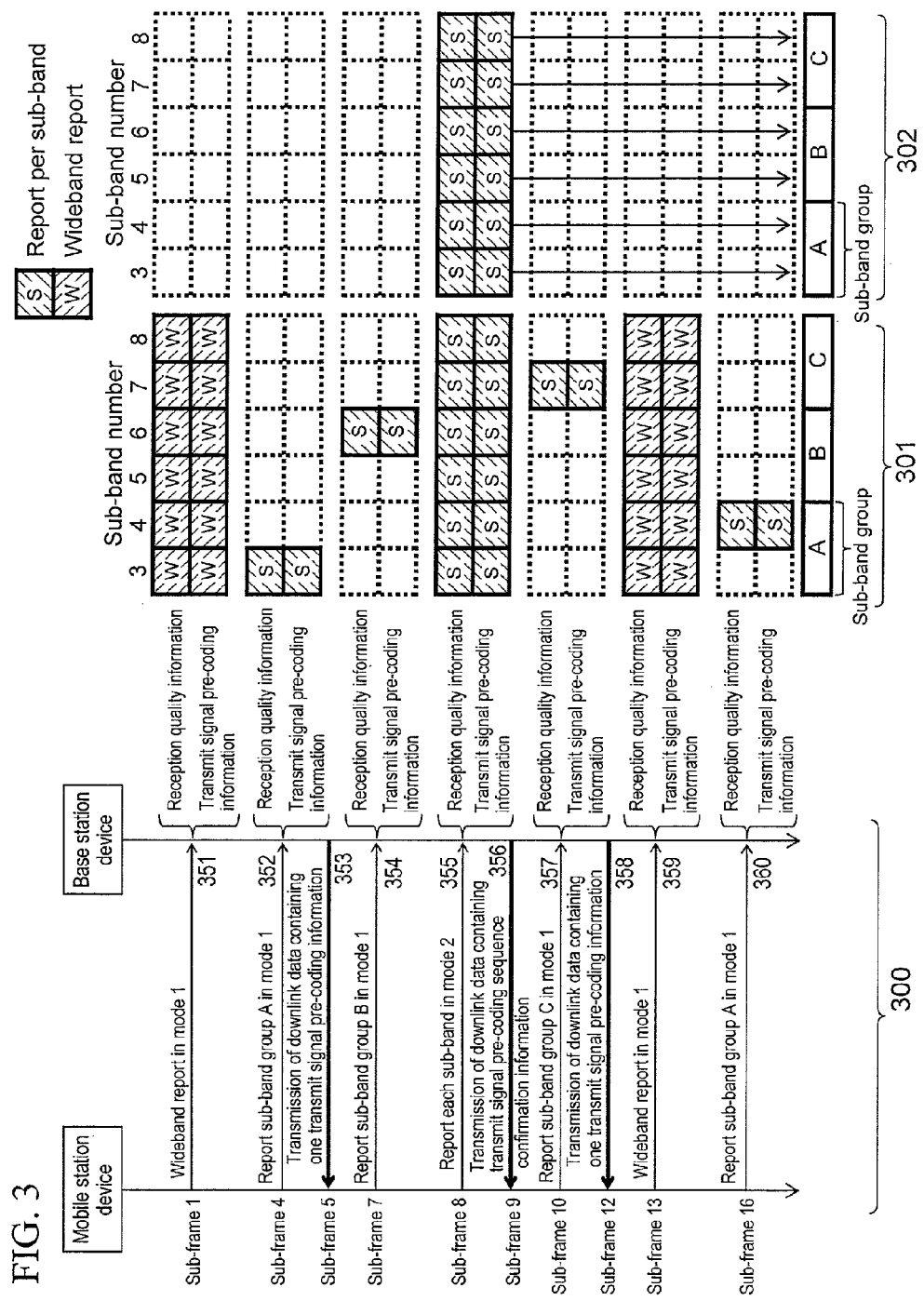
FIG. 3 is a diagram comprising a sequence diagram showing the process flow between a base station apparatus and a mobile station apparatus in a mobile communication system according to the present embodiment, a table showing transmit signal pre-coding information that is transmitted/received at the mobile station apparatus and the base station apparatus in each sub-frame, and a table showing the status of application of transmit signal sequence number information to transmit signal pre-coder confirmation in each sub-frame.

FIG. 3 comprises, with respect to a mobile communication system according to the present embodiment, a sequence diagram (300) showing the process flow between the base station apparatus and the mobile station apparatus, a table (301) showing transmit signal pre-coding information that is transmitted/received at the mobile station apparatus and the base station apparatus in each sub-frame, and a table (302) showing the status of application of transmit signal sequence number information to transmit signal pre-coder confirmation in each sub-frame. Feedback of reception quality information and transmit signal pre-coding information according to the present embodiment is performed in the two modes in FIG. 13 and FIG. 14 that are set simultaneously.

Figure 13:
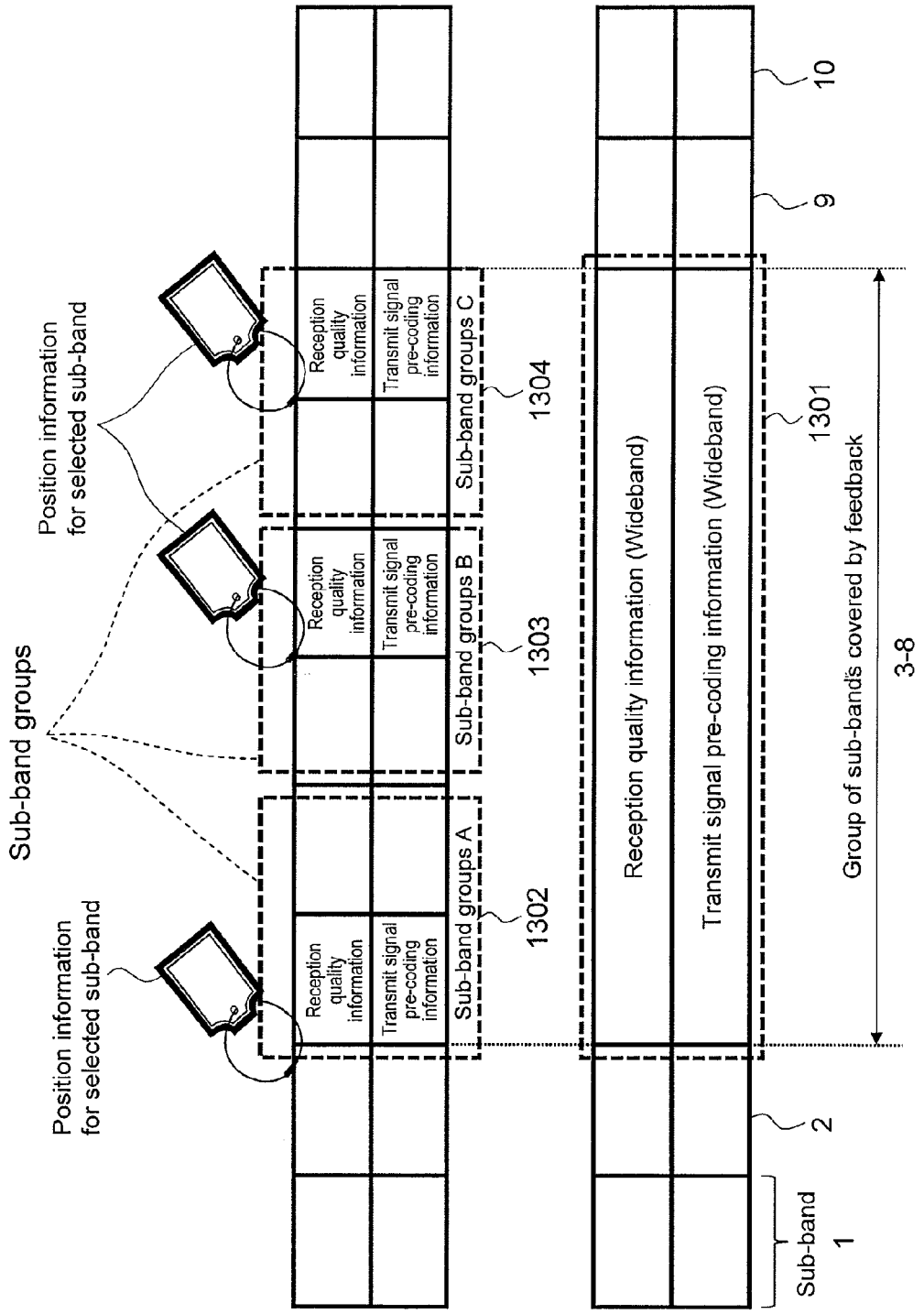
FIG. 13 is a diagram showing two feedback modes that are used simultaneously (mode 1 and mode 2).

FIG. 13 is a feedback mode in which wideband reception quality information and transmit signal pre-coding information, and one reception quality information and transmit signal pre-coding information for one sub-band selected from each sub-band group are transmitted on PUCCH. The respective reception quality information and transmit signal pre-coding information are transmitted in different sub-frames. This will be referred to as mode 1 in the present embodiment.

Figure 14:
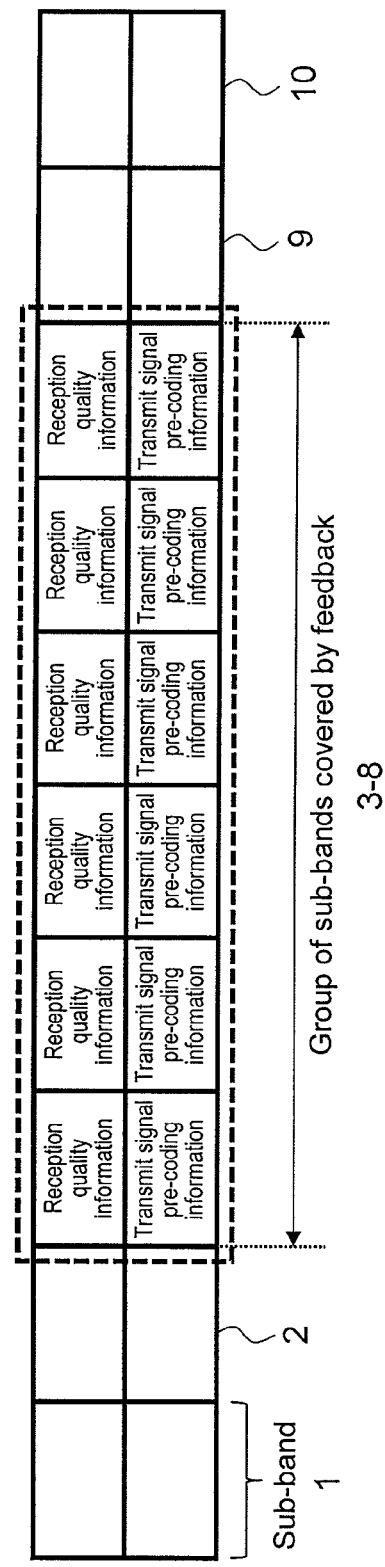
FIG. 14 is a diagram showing two feedback modes that are used simultaneously (mode 1 and mode 2).

FIG. 14 is a mode in which respective reception quality information and transmit signal pre-coding information corresponding to all sub-bands are simultaneously transmitted in one sub-frame using PUSCH. This will be referred to as mode 2 in the present embodiment.

In the case where a downlink signal accompanied by transmit signal pre-coder confirmation is transmitted/received in a situation where these two feedback modes are being used simultaneously, a feature of the present embodiment is that with respect to the transmit signal pre-coding information indicated by the transmit signal pre-coder confirmation, only those that are transmitted in mode 2 are relevant. However, the determination as to which mode is relevant may be made by the base station apparatus and be reported to the mobile station apparatus. Alternatively, it may be defined in advance through specifications, etc.

Here, with respect to the downlink signal between the mobile station apparatus and the base station apparatus, it is assumed that spatial multiplexing based on MIMO/SM schemes, which require pre-coding of transmit signals, is performed in the time range indicated in the present embodiment. Further, it is assumed that, as information representing a transmit signal pre-coding sequence applied to the downlink signal, one of the following is always reported to the mobile station apparatus as a downlink control signal: (1) transmit signal pre-coder confirmation representing the fact that the most recent transmit signal pre-coding information reported in the above-mentioned mode 2 is used; and (2) one transmit signal pre-coding information that is applied to the whole assigned resources Next, with respect to FIG. 3, a description will be provided regarding operations for reporting reception quality information and transmit signal pre-coding information from the mobile station apparatus to the base station apparatus in each sub-frame, and the processing of the transmit signal pre-coding information that is applied to the transmit signal pre-coder confirmation corresponding thereto. In sub-frames 1 and 13, one reception quality information and transmit signal pre-coding information are transmitted in mode 1 with respect to all sub-bands (351 and 359). In sub-frames 4, 7, 10 and 16, reception quality information and transmit signal pre-coding information with respect to the sub-bands selected by the mobile station apparatus from among their respective sub-band groups, and information (3, 6, 7 and 4) corresponding to the position of the sub-bands covered thereby are transmitted (352, 354, 357 and 360).

On the other hand, feedback using mode 2 is performed in sub-frame 8. Here, aperiodic feedback of reception quality information and transmit signal pre-coding information is performed, and reception quality information and transmit signal pre-coding information are transmitted with respect to each of sub-bands 3 to 8 (355). In the present embodiment, the transmit signal pre-coder confirmation covers only transmit signal pre-coding information that is transmitted in mode 2, and from sub-frame 8 and onward, the transmit signal pre-coder confirmation reported along with downlink matches the sub-band transmit signal pre-coding information reported in 355 (see reference numeral 302 in the diagram on the right). This may be discarded after a predetermined period, that is, application of the transmit signal pre-coder confirmation may be invalidated. Alternatively, when a succeeding feedback in mode 2 is performed, it may be overwritten thereby.

Next, operations will be described with reference to a case where a downlink signal is transmitted from the base station apparatus to the mobile station apparatus in sub-frames 5, 9 and 12. When transmission of a downlink signal is performed in sub-frame 5, feedback of reception quality information and transmit signal pre-coding information in mode 2 which would be covered by the transmit signal pre-coder confirmation is not performed yet at this point. Thus, information on the pre-coding that was applied to all assigned resources is added to the downlink control signal and transmitted (353). In sub-frame 9, a downlink signal is transmitted, and transmit signal pre-coder confirmation is added thereto. With respect to this case, the mobile station apparatus determines that the downlink signal has been pre-coded using the transmit signal pre-coding information transmitted in sub-frame 8, and demodulates the received signal using it. Sub-frame 12 represents a case where downlink data is transmitted with only sub-band 7 assigned. In so doing, it is preferable that the base station apparatus use the reception quality information and the transmit signal pre-coding information for sub-band 7 that were reported in sub-frame 10. Thus, the base station apparatus transmits to the mobile station apparatus the transmit signal pre-coding information obtained in sub-frame 10 by explicitly including it in the downlink control information (358).

When thus feeding back reception quality information and transmit signal pre-coding information in a situation where a plurality of modes are simultaneously configured, by limiting the mode to which the transmit signal pre-coder confirmation corresponds, there is an advantage in that management as to which transmit signal pre-coding information was used with respect to which sub-band becomes easier.

Second Embodiment

Figure 4:
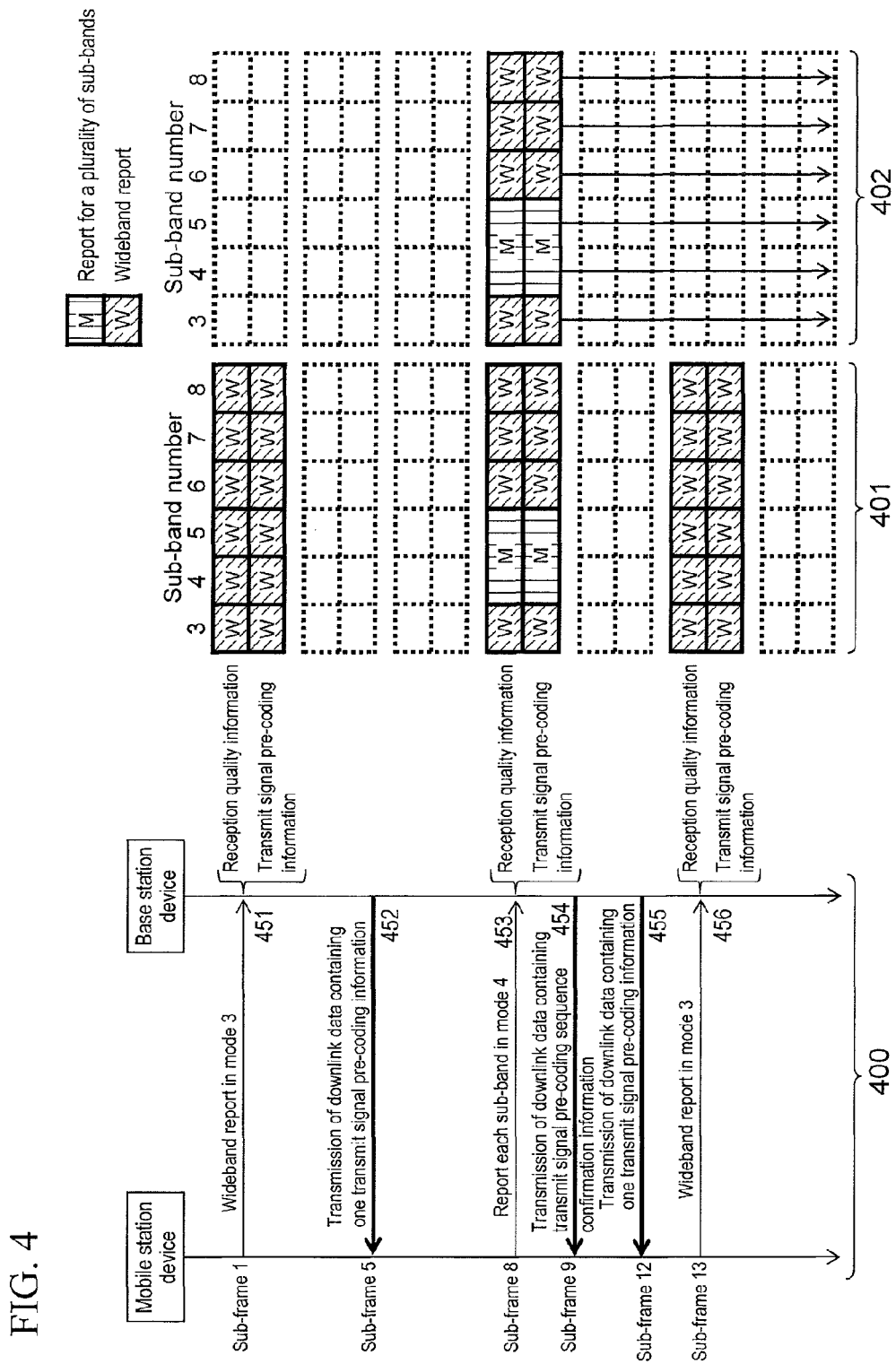
FIG. 4 comprises a sequence diagram illustrating the process flow between a base station apparatus and a mobile station apparatus of a mobile communication system according to a second embodiment of the present invention, a table showing transmit signal pre-coding information that is transmitted/received at the mobile station apparatus and the base station apparatus in each sub-frame, and a table showing the status of application of transmit signal sequence number information to transmit signal pre-coder confirmation in each sub-frame.

FIG. 4 comprises a sequence diagram (400) illustrating the process flow between a base station apparatus and a mobile station apparatus of a mobile communication system according to the present embodiment, a table (401) showing transmit signal pre-coding information that is transmitted/received at the mobile station apparatus and the base station apparatus in each sub-frame, and a table (402) showing the status of application of transmit signal sequence number information to transmit signal pre-coder confirmation in each sub-frame. It is assumed that for transmission modes for reception quality information and transmit signal pre-coding information that are to be configured in the present embodiment, those shown in FIG. 5 and FIG. 6 are configured simultaneously.

Figure 5:
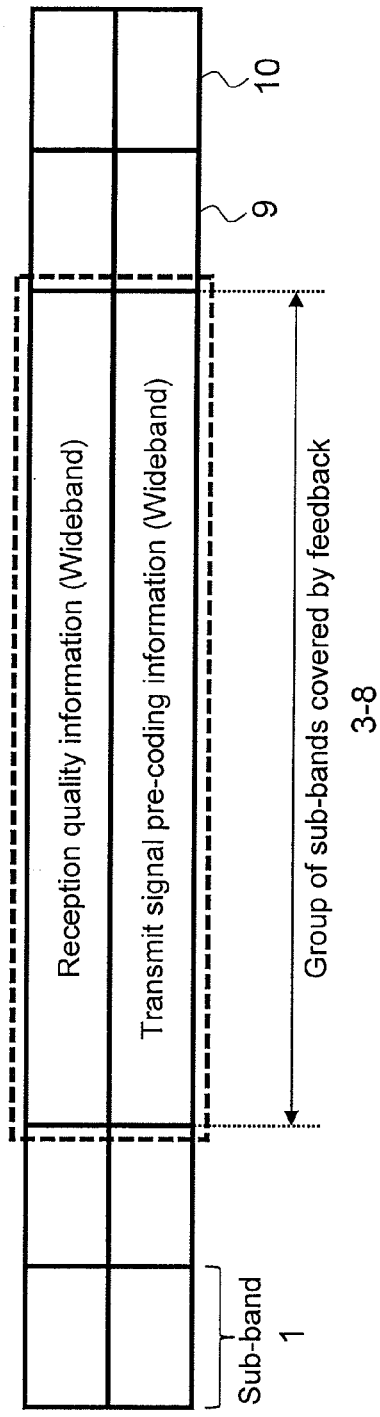
FIG. 5 is a diagram showing a feedback mode in which wideband reception quality information and transmit signal pre-coding information are transmitted on PUCCH (mode 3).

FIG. 5 is a feedback mode in which wideband reception quality information and transmit signal pre-coding information are transmitted on PUCCH. This will be referred to as mode 3 in the present embodiment.

Figure 6:
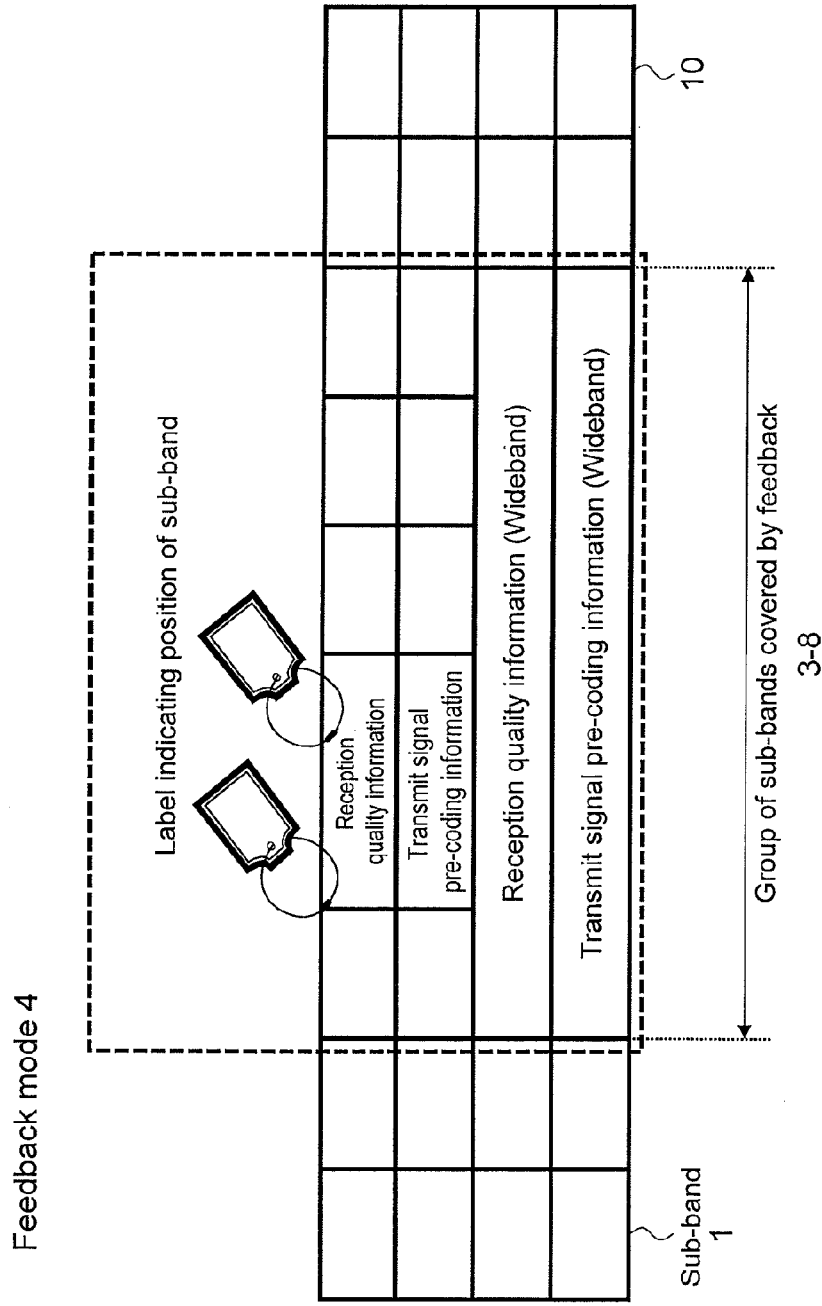
FIG. 6 is a feedback mode in which all wideband reception quality information and transmit signal pre-coding information as well as one reception quality information and transmit signal pre-coding information that are applied to a plurality of sub-bands selected by a mobile station apparatus are transmitted on PUSCH.

FIG. 6 is a feedback mode in which all wideband reception quality information and transmit signal pre-coding information, and one reception quality information and transmit signal pre-coding information that are to be applied to a plurality of sub-bands selected by the mobile station apparatus are transmitted on PUSCH. In this mode, information indicating the positions of the sub-bands selected by the mobile station apparatus is also simultaneously transmitted. In addition, transmission of all of the information above is completed at once in one sub-frame. This will be referred to as mode 4 in the present embodiment.

In the case where a downlink signal accompanied by transmit signal pre-coder confirmation is transmitted/received in a situation where these two feedback modes are being used simultaneously, a feature of the present embodiment is that with respect to the transmit signal pre-coding information indicated by the transmit signal pre-coder confirmation, only those that are transmitted in mode 4 are relevant. Here, the determination as to which mode is relevant may be made by the base station apparatus and be reported to the mobile station apparatus. Alternatively, it may be defined in advance through specifications, etc.

In addition, with respect to the downlink signal between the mobile station apparatus and the base station apparatus, it is assumed that spatial multiplexing based on MIMO/SM schemes is applied in the present embodiment. Further, as information representing a transmit signal pre-coding sequence applied to the downlink signal, one of the following is always reported to the mobile station apparatus as a downlink control signal: (1) transmit signal pre-coder confirmation representing the fact that the most recent transmit signal pre-coding information reported in the above-mentioned mode 4 is used; and (2) one transmit signal pre-coding information that is applied to the assigned resources as a whole.

Next, operations for reporting reception quality information and transmit signal pre-coding information from the mobile station apparatus to the base station apparatus in each sub-frame in FIG. 4 will be described. In sub-frames 1 and 13, one reception quality information and transmit signal pre-coding information are transmitted in mode 3 with respect to all sub-bands (451 and 456). On the other hand, feedback using mode 4 is performed in sub-frame 8. Here, aperiodic feedback of reception quality information and transmit signal pre-coding information is performed, and reception quality information and transmit signal pre-coding information to be applied to sub-bands 4 and 5, as well as wideband reception quality information and transmit signal pre-coding information applicable to all of sub-bands 3 to 8 are transmitted (453).

In the present embodiment, the transmit signal pre-coder confirmation covers only transmit signal pre-coding information that is transmitted in mode 4, and from sub-frame 8 and onward, the transmit signal pre-coder confirmation reported along with downlink matches the transmit signal pre-coding information reported in 453 (402).

The valid period during which the transmit signal pre-coding information transmitted in mode 4 is covered by the transmit signal pre-coder confirmation may be limited to a predetermined period from the time of transmission/reception thereof, that is, application of the transmit signal pre-coder confirmation may be invalidated. Alternatively, when a succeeding feedback in mode 4 is performed, it may be overwritten thereby.

Next, operations will be described with reference to a case where a downlink signal is transmitted from the base station apparatus to the mobile station apparatus in sub-frames 5, 9 and 12. When downlink signal is transmitted in sub-frame 5, feedback of reception quality information and transmit signal pre-coding information in mode 2 which would be covered by the transmit signal pre-coder confirmation is not performed yet at this point. Thus, information on the pre-coding that was applied to all assigned resources is added to the downlink control signal and transmitted (452). In sub-frame 9, a downlink signal is transmitted, and transmit signal pre-coder confirmation is added thereto. With respect to this case, the mobile station apparatus determines that the downlink signal has been pre-coded using the transmit signal pre-coding information transmitted in sub-frame 8, and demodulates the received signal using the transmit signal pre-coding information that is retained as indicated in 402. Sub-frame 12 represents a case where downlink data is transmitted with sub-band 7 assigned. In so doing, it is preferable that the base station apparatus use the reception quality information and the transmit signal pre-coding information for sub-band 7 that were reported in sub-frame 8. Thus, the base station apparatus transmits to the mobile station apparatus the transmit signal pre-coding information obtained in sub-frame 8 by explicitly including it in the downlink control information (455).

When thus feeding back reception quality information and transmit signal pre-coding information in a situation where a plurality of modes are simultaneously configured, by limiting the mode to which the transmit signal pre-coder confirmation corresponds, management as to which transmit signal pre-coding information was used with respect to which sub-band becomes easier.

Third Embodiment

Figure 7:
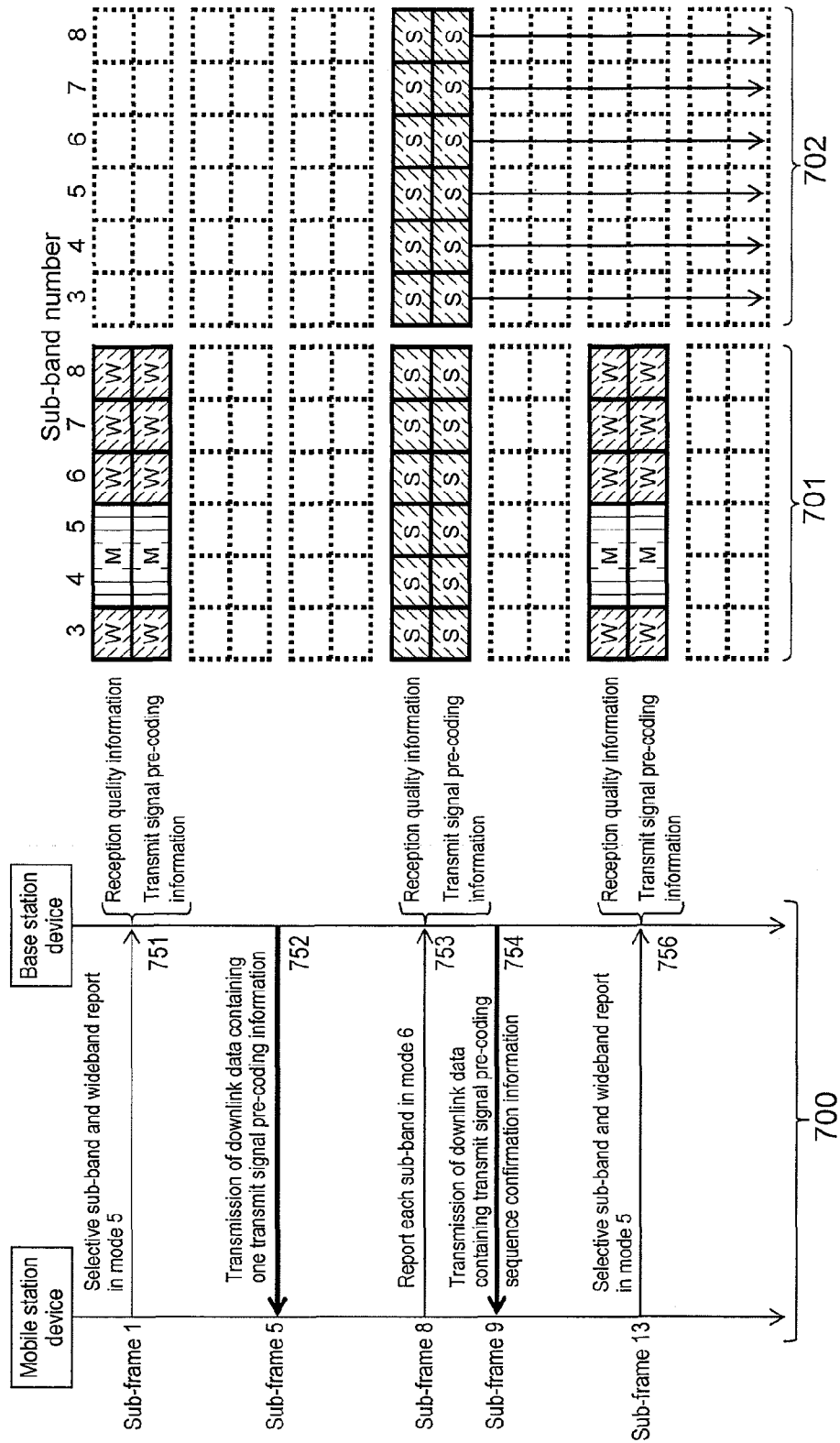
FIG. 7 is a diagram showing operations in each sub-frame for reporting reception quality information and transmit signal pre-coding information from a mobile station apparatus to a base station apparatus.

FIG. 7 is a diagram showing a sequence diagram (700) illustrating the process flow between a base station apparatus and a mobile station apparatus of a mobile communication system according to the present embodiment, a table (701) showing transmit signal pre-coding information that is transmitted/received at the mobile station apparatus and the base station apparatus in each sub-frame, and a table (702) showing the status of application of transmit signal sequence number information to transmit signal pre-coder confirmation in each sub-frame. It is assumed that feedback of reception quality information and transmit signal pre-coding information in the present embodiment is performed in the two modes shown in FIG. 8 and FIG. 9 that are set simultaneously.

Figure 8:
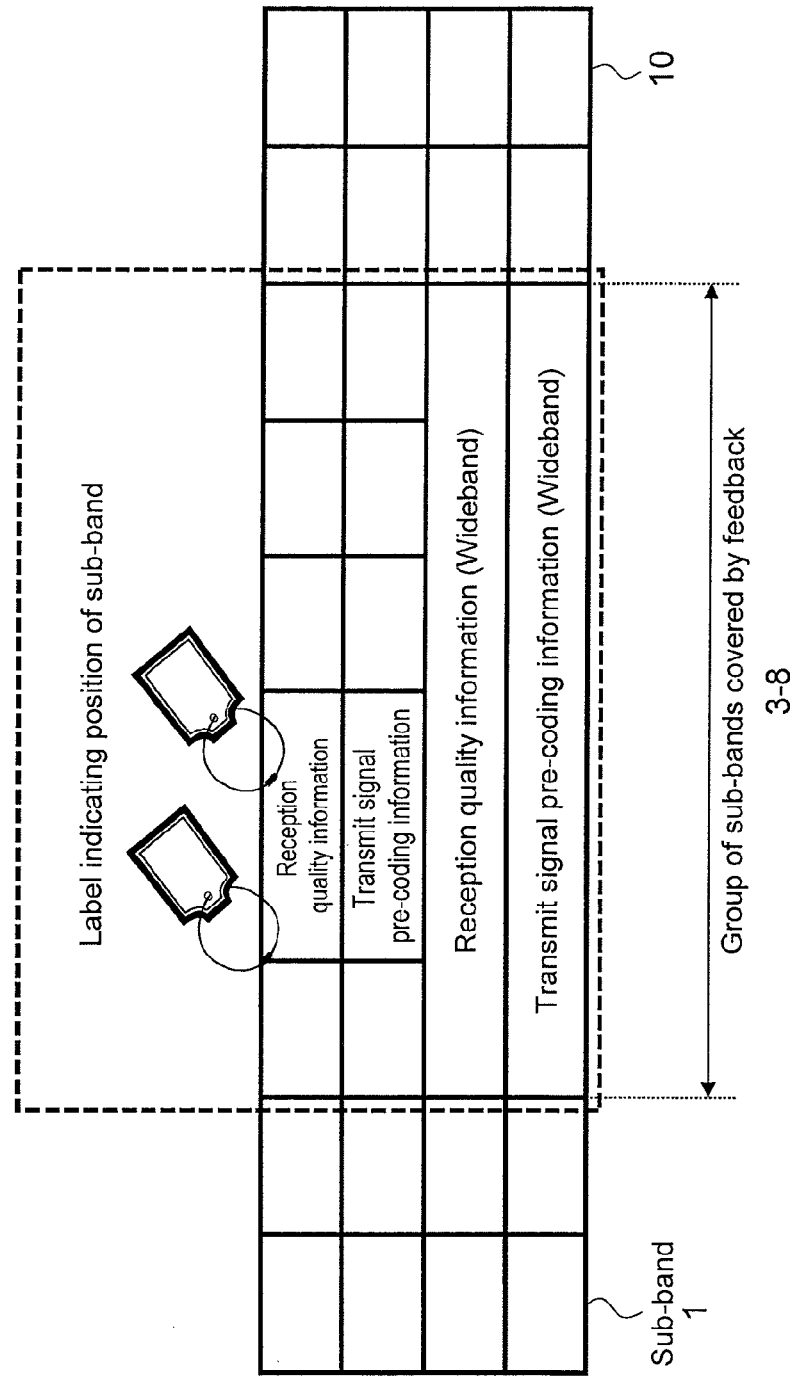
FIG. 8 is a diagram showing a feedback mode in which all wideband reception quality information and transmit signal pre-coding information as well as one reception quality information and transmit signal pre-coding information that are applied to a plurality of sub-bands selected by a mobile station apparatus are transmitted on PUSCH.

FIG. 8 is a feedback mode in which all wideband reception quality information and transmit signal pre-coding information, as well as one reception quality information and transmit signal pre-coding information that are to be applied to a plurality of sub-bands selected by the mobile station apparatus are transmitted on PUSCH. In this mode, information indicating the positions of the sub-bands selected by the mobile station apparatus is also simultaneously transmitted. In addition, transmission of all of the information above is completed at once in one sub-frame. This will be referred to as mode 5 in the present embodiment.

Figure 9:
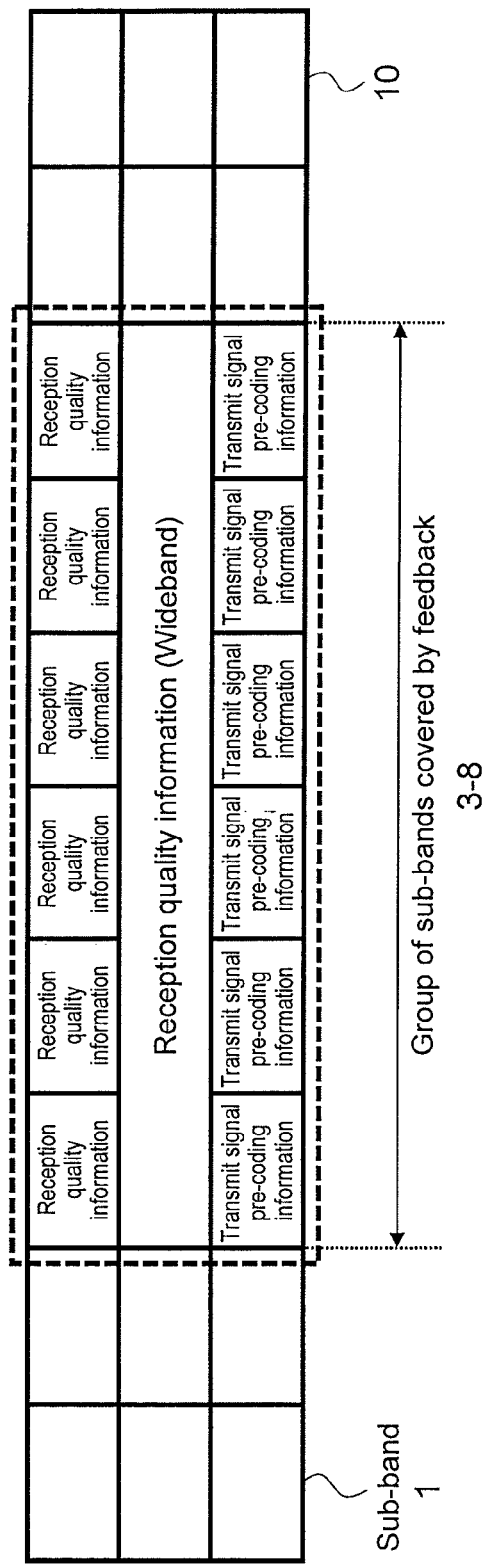
FIG. 9 is a diagram showing a mode in which respective reception quality information and transmit signal pre-coding information corresponding to all sub-bands are simultaneously transmitted in one sub-frame using PUSCH (mode 6).

FIG. 9 is a mode in which respective reception quality information and transmit signal pre-coding information corresponding to all sub-bands are simultaneously transmitted in one sub-frame using PUSCH. This will be referred to as mode 6 in the present embodiment (this is the same as mode 2 in the first embodiment).

If a downlink signal accompanied by transmit signal pre-coder confirmation is transmitted/received in a situation where these two feedback modes are being used simultaneously, a feature of the present embodiment is that only the transmit signal pre-coding information transmitted in mode 6 would be relevant. Here, the determination as to which mode is relevant may be made by the base station apparatus and be reported to the mobile station apparatus. Alternatively, it may be defined in advance through specifications, etc.

In addition, with respect to the downlink signal between the mobile station apparatus and the base station apparatus, it is assumed that spatial multiplexing based on MIMO/SM schemes is performed in the present embodiment. Further, as information representing a transmit signal pre-coding sequence applied to the downlink signal, one of the following is always reported to the mobile station apparatus as a downlink control signal: (1) transmit signal pre-coder confirmation representing the fact that the most recent transmit signal pre-coding information reported in the above-mentioned mode 6 is used; and (2) one transmit signal pre-coding information that is applied to the assigned resources as a whole.

Next, operations for reporting reception quality information and transmit signal pre-coding information from the mobile station apparatus to the base station apparatus in each sub-frame in FIG. 7 will be described. In sub-frame 1, one reception quality information and transmit signal pre-coding information to be applied to sub-bands 4 and 5 selected by the base station apparatus, as well as wideband reception quality information and transmit signal pre-coding information applicable to all of sub-bands 3 to 8 are transmitted in mode 5 (751). The operations in sub-frame 13 are similar (756). On the other hand, feedback using mode 6 is performed in sub-frame 8. Here, aperiodic feedback of reception quality information and transmit signal pre-coding information is performed, and the respective reception quality information and transmit signal pre-coding information corresponding to each sub-band are transmitted (753). In the present embodiment, the transmit signal pre-coder confirmation covers only transmit signal pre-coding information that is transmitted in mode 6, and from sub-frame 8 and onward, the transmit signal pre-coder confirmation reported along with downlink matches the transmit signal pre-coding information reported in 753 (702). This may be discarded after a predetermined period, that is, application of the transmit signal pre-coder confirmation may be invalidated. Alternatively, when a succeeding feedback in mode 6 is performed, it may be overwritten thereby.

Next, operations will be described with reference to a case where a downlink signal is transmitted from the base station apparatus to the mobile station apparatus in sub-frames 5 and 9. When transmission of a downlink signal is performed in sub-frame 5, feedback of reception quality information and transmit signal pre-coding information in mode 2 which would be covered by the transmit signal pre-coder confirmation is not performed yet at this point. Thus, information that explicitly indicates the pre-coding sequence applied to all assigned resources is added to the downlink control signal and transmitted (752).

In sub-frame 9, a downlink signal is transmitted, and transmit signal pre-coder confirmation is added thereto. With respect to this case, the mobile station apparatus determines that the downlink signal has been pre-coded using the transmit signal pre-coding information transmitted in sub-frame 8, and demodulates the received signal using the transmit signal pre-coding information that is retained as indicated in 702.

When thus feeding back reception quality information and transmit signal pre-coding information in a situation where a plurality of modes are simultaneously set, by limiting the mode to which the transmit signal pre-coder confirmation corresponds, management as to which transmit signal pre-coding information was used with respect to which sub-band becomes easier.

Fourth Embodiment

Figure 10:
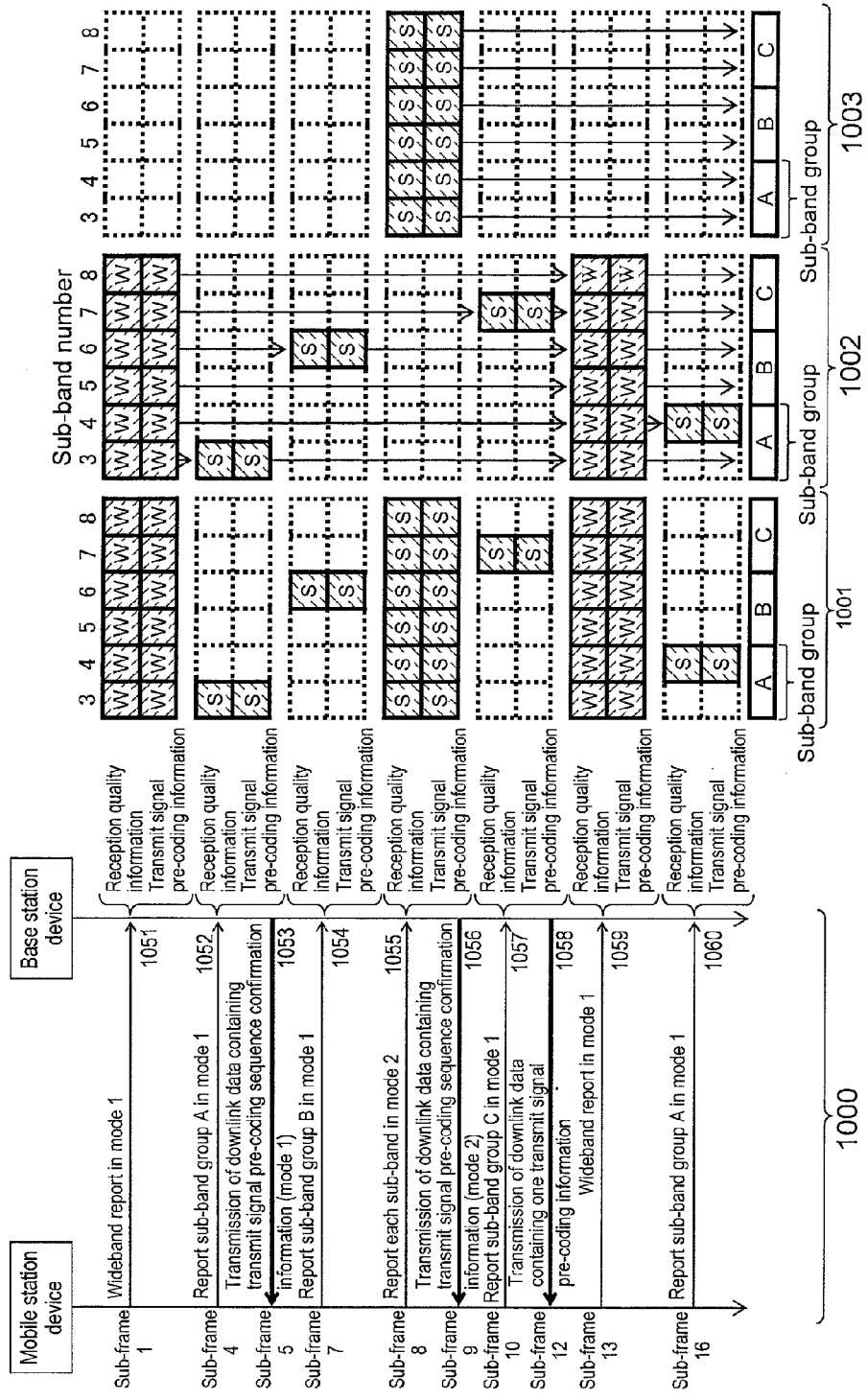
FIG. 10 is a diagram showing a sequence diagram illustrating the process flow between a base station apparatus and a mobile station apparatus of a mobile communication system according to a fourth embodiment of the present invention, a table showing transmit signal pre-coding information that is transmitted/received at the mobile station apparatus and the base station apparatus in each sub-frame, and a table showing the status of application of transmit signal sequence number information to transmit signal pre-coder confirmation in each sub-frame.
Figure 11:
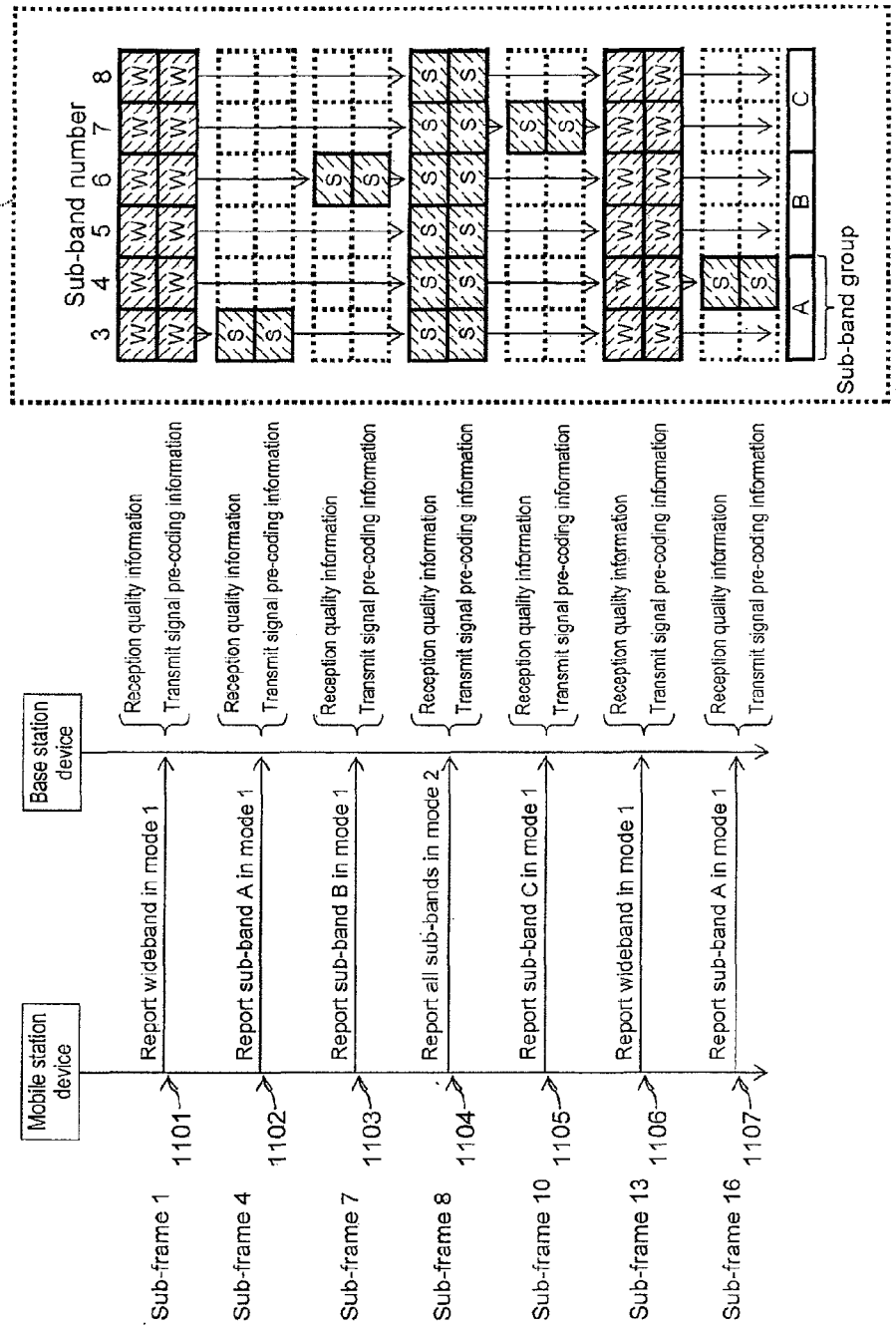
FIG. 11 is a diagram showing a sequence with respect to a mobile station apparatus and a base station apparatus in accordance with Non-Patent Document 1.

FIG. 10 is a diagram showing a sequence diagram (1000) illustrating the process flow between a base station apparatus and a mobile station apparatus of a mobile communication system according to the present embodiment, a table (1001) showing transmit signal pre-coding information that is transmitted/received at the mobile station apparatus and the base station apparatus in each sub-frame, and tables (1002 and 1003) showing the status of application of transmit signal sequence number information to transmit signal pre-coder confirmation in each sub-frame. Feedback of reception quality information and transmit signal pre-coding information in the present embodiment is performed in the two modes shown in FIG. 13 and FIG. 14 that are set simultaneously. These modes are similar to mode 1 and mode 2 in the first embodiment of the present invention, and feedback of reception quality information and transmit signal pre-coding information in mode 1 and mode 2 is performed.

If a downlink signal accompanied by transmit signal pre-coder confirmation is transmitted/received in a situation where these two feedback modes are being used simultaneously, a feature of the present embodiment is that information indicating transmit signal pre-coding information transmitted in which mode is to be covered is contained in the transmit signal pre-coder confirmation.

In the present embodiment, it is assumed that there is contained information for identifying mode 1 and mode 2. Which mode this information corresponds to may be defined in advance through specifications, etc. Alternatively, it may be dynamically set from the base station apparatus with respect to the mobile station apparatus. In addition, with respect to the downlink signal between the mobile station apparatus and the base station apparatus, it is assumed that spatial multiplexing based on MIMO/SM schemes is performed in the present embodiment. Further, as information representing a transmit signal pre-coding sequence applied to the downlink signal, one of the following is always reported to the mobile station apparatus as a downlink control signal: (1) transmit signal pre-coder confirmation representing the fact that the most recent transmit signal pre-coding information reported in the above-mentioned mode 1 or mode 2 is used; and (2) one transmit signal pre-coding information that is applied to the assigned resources as a whole.

The operations for reporting reception quality information and transmit signal pre-coding information from the mobile station apparatus to the base station apparatus in each sub-frame in FIG. 10 are similar to those in the first embodiment (1051, 1052, 1054, 1055, 1057, 1059 and 1060). In the present embodiment, the transmit signal pre-coder confirmation covers both transmit signal pre-coding information transmitted in mode 1 as well as mode 2. Specifically, when "mode 1" is specified in the transmit signal pre-coder confirmation, transmit signal pre-coding information transmitted in mode 1 (1051, 1052, 1054, 1057, 1059 and 1060) is applied to the transmit signal pre-coder confirmation (1002). Further, when "mode 2" is specified in the transmit signal pre-coder confirmation, transmit signal pre-coding information transmitted in mode 2 (1055) is applied to the transmit signal pre-coder confirmation (1003). This may be discarded after a predetermined period, that is, application of the transmit signal pre-coder confirmation may be invalidated. Alternatively, when a succeeding feedback in the same mode is performed, it may be overwritten thereby.

Next, operations will be described with reference to a case where a downlink signal is transmitted from the base station apparatus to the mobile station apparatus in sub-frames 5, 9 and 12.

In sub-frame 5, transmission of a downlink signal using resources belonging to sub-bands 3 and 4 is performed. Here, transmit signal pre-coder confirmation specifying mode 1 is added to the downlink control signal and transmitted (1053). In so doing, the base station apparatus performs pre-coding respectively using the transmit signal pre-coding information of sub-band 3 transmitted in 1052 for sub-band 3 and the wideband transmit signal pre-coding signal for sub-band 4, and the mobile station apparatus processes the received signals on the assumption that the above have been applied.

In sub-frame 9, transmission of a downlink signal using resources belonging to sub-bands 4 and 5 is performed. Here, transmit signal pre-coder confirmation specifying mode 2 is added to the downlink control signal and transmitted (1056). In so doing, the base station apparatus performs pre-coding respectively using the respective transmit signal pre-coding information transmitted in 1052 with respect to each of the sub-bands, and the mobile station apparatus processes the received signals on the assumption that the above have been applied.

Sub-frame 12 shows an example where transmission of a downlink signal using resources belonging to sub-bands 6 and 7 is performed. Here, one transmit signal pre-coding sequence information applied to the assigned resource is added to the downlink control signal and transmitted (1058). In so doing, for the pre-coding applied at the base station apparatus, the transmit signal pre-coding signal applied by the base station apparatus is applied regardless of the sub-band to which the resource belongs or of past feedbacks, and the mobile station apparatus processes the received signal using the transmit signal pre-coding information that is transmitted along with the downlink signal.

When thus feeding back reception quality information and transmit signal pre-coding information in a situation where a plurality of modes are simultaneously set, by limiting the mode to which the transmit signal pre-coder confirmation corresponds, management as to which transmit signal pre-coding information was used with respect to which sub-band becomes easier.

Fifth Embodiment

Figure 12:
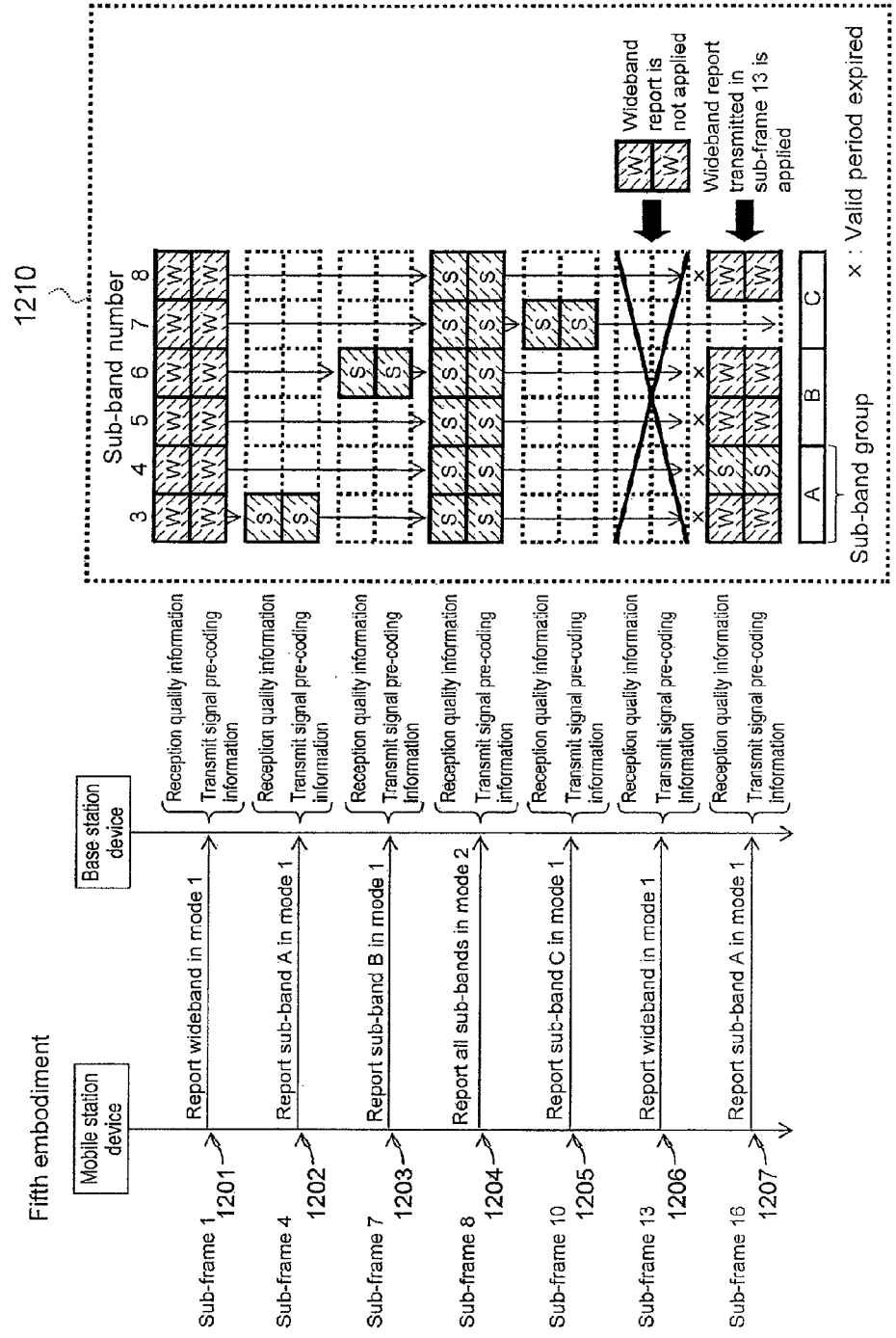
FIG. 12 is a diagram showing a sequence diagram illustrating the process flow between a base station apparatus and a mobile station apparatus of a mobile communication system according to a fifth embodiment of the present invention, and a table showing the status of application of transmit signal sequence number information to transmit signal pre-coder confirmation in each sub-frame.

FIG. 12 is a diagram showing a sequence diagram illustrating the process flow between a base station apparatus and a mobile station apparatus of a mobile communication system according to the present embodiment, and a table (1210) showing the status of application of transmit signal sequence number information to transmit signal pre-coder confirmation in each sub-frame. This diagram illustrates what kind of criteria (priority) the plurality of transmit signal sequence number information transmitted from the mobile station apparatus is applied to transmit signal pre-coder confirmation with. Feedback of reception quality information and transmit signal pre-coding information in the present embodiment is performed in the two modes in FIG. 13 and FIG. 14 that are set simultaneously. These modes are similar to those in the first embodiment of the present invention, and feedback of reception quality information and transmit signal pre-coding information in mode 1 and mode 2 is performed.

It differs from the first embodiment in that wideband transmit signal pre-coding information is never applied by overwriting sub-band transmit signal pre-coding information, that is, that sub-band transmit signal pre-coding information always has priority over wideband transmit signal pre-coding information. Specifically, this is reflected in the operations in sub-frames 13 and 16. With respect to sub-frame 13, it is assumed that the wideband transmit signal pre-coding information transmitted here cannot overwrite the sub-band transmit signal pre-coding information that had been retained up to that point (1206). In this case, if no new sub-band transmit signal pre-coding information with respect to the same sub-band is transmitted/received, old sub-band transmit signal pre-coding information would continue to be retained semi-permanently. Since the optimal transmit signal pre-coding information and reception quality information vary with the propagation channel, to have information remain over extended periods is unfavorable in terms of the characteristics of downlink signals as well. In order to address this, the mobile station apparatus and the base station apparatus erase sub-band transmit signal pre-coding information at pre-defined times. Here, in sub-frame 16, first, the sub-band transmit signal pre-coding information that was transmitted in sub-frame 8 is completely erased. With respect to the sub-band transmit signal pre-coding information remaining at this point, only that for sub-band 7 received in sub-frame 10 and that for sub-band 4 newly received in sub-frame 16 would be remaining. As such, for the other sub-bands, the wideband transmit signal pre-coding information received in sub-frame 13 is applied (1207).

When thus feeding back reception quality information and transmit signal pre-coding information in a situation where a plurality of modes are simultaneously set, by granting an order of priority that is in accordance with the width of the band that the transmit signal pre-coding information, to which the transmit signal pre-coder confirmation corresponds, is applied to, management as to which transmit signal pre-coding information was used with respect to which sub-band becomes easier. In addition, since feedback information that has become incongruent with the channel state with the passage of time from feedback is invalidated after a predetermined period, degradation in characteristics due to the use of such information can be prevented. It is noted that the time for invalidation may be defined in advance through specifications, etc., or it may be computable from the period of the feedback mode of that itself or from the period of another feedback mode that is simultaneously set. Further, this time may also be explicitly reported from the base station apparatus.

Sixth Embodiment

Figure 15:
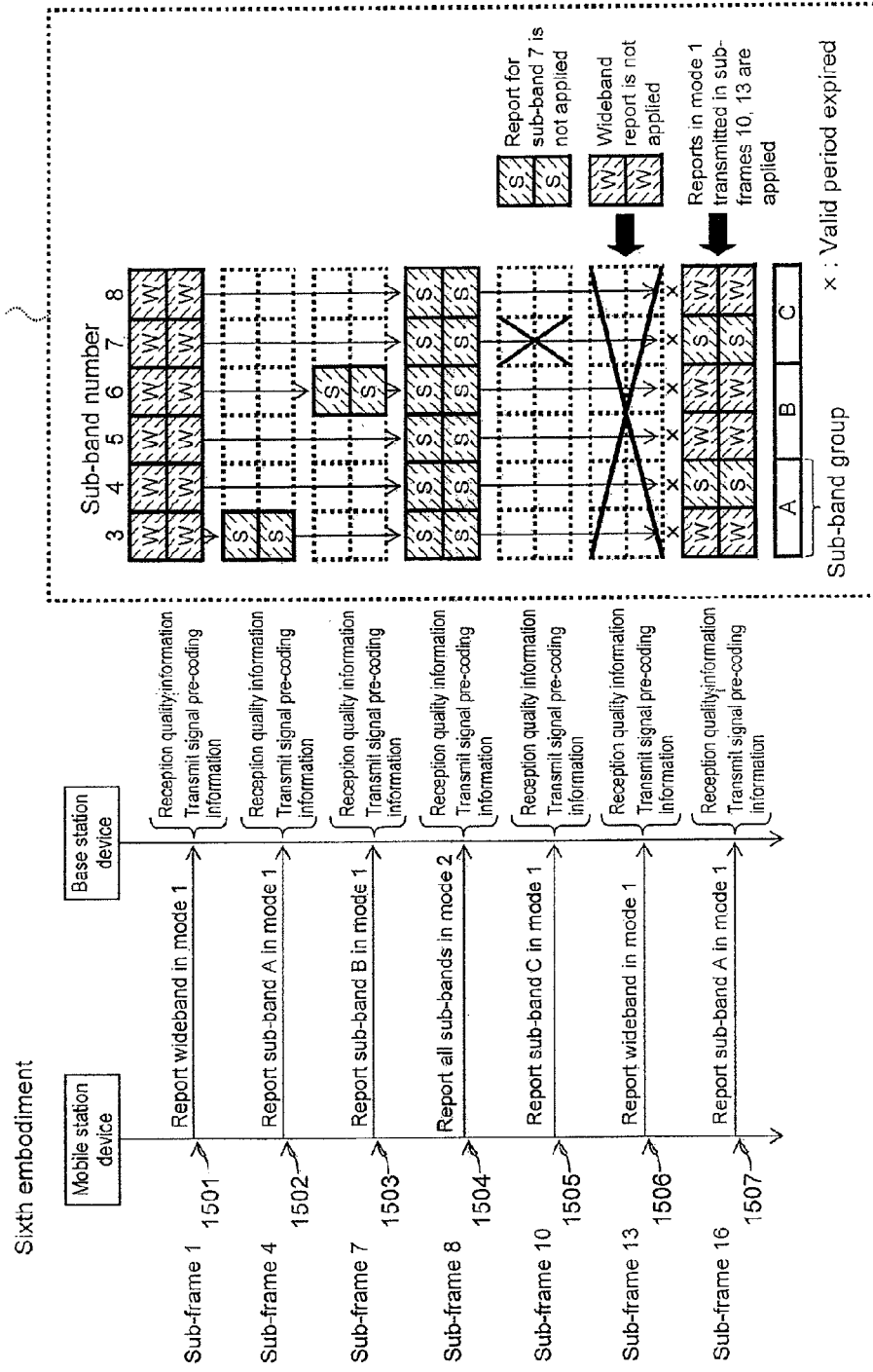
FIG. 15 is a diagram showing a sequence diagram illustrating the process flow between a base station apparatus and a mobile station apparatus of a mobile communication system according to a sixth embodiment of the present invention, and a table showing the status of application of transmit signal sequence number information to transmit signal pre-coder confirmation in each sub-frame.

FIG. 15 represents a sequence diagram illustrating the process flow between a base station apparatus and a mobile station apparatus of a mobile communication system according to the present embodiment, and a table (1510) showing the status of application of transmit signal sequence number information to transmit signal pre-coder confirmation in each sub-frame. This diagram illustrates what kind of criteria (priority) the plurality of transmit signal sequence number information transmitted from the mobile station apparatus is applied to transmit signal pre-coder confirmation with. Feedback of reception quality information and transmit signal pre-coding information in the present embodiment is performed in the two modes in FIG. 13 and FIG. 14 that are set simultaneously. These modes are similar to those in the fifth embodiment of the present invention, and feedback of reception quality information and transmit signal pre-coding information in mode 1 and mode 2 is performed.

It differs from the fifth embodiment in that transmit signal pre-coding information fed back in mode 1 cannot overwrite and be applied over transmit signal pre-coding information fed back in mode 2. Specifically, it concerns the operations in sub-frame 10, and the sub-band transmit signal pre-coding information transmitted here cannot overwrite the sub-band transmit signal pre-coding information in mode 2 that is already applied (1505). In other words, even if the band width the transmit signal pre-coding information is to be applied to is the same, priority is determined based on the difference in mode regardless of the earliness/lateness of the time of transmission/reception, and here, mode 2 is given priority over mode 1. In this case, if no new sub-band transmit signal pre-coding information in mode 2 is transmitted/received, old sub-band transmit signal pre-coding information would continue to be retained semi-permanently. Since the optimal transmit signal pre-coding information and reception quality information vary with the propagation channel, to have information that is dependent on the propagation channel remain over extended periods is unfavorable in terms of the characteristics of downlink signals as well. With respect to the above, it is assumed that the mobile station apparatus and the base station apparatus erase sub-band transmit signal pre-coding information at pre-defined times. Here, in sub-frame 16, first, the sub-band transmit signal pre-coding information that was transmitted in sub-frame 8 is completely erased. Further, the sub-band transmit signal pre-coding information for sub-band 7 received in sub-frames 10 and 13 and the wideband transmit signal pre-coding information received in sub-frame 13 are applied and newly received in sub-frame 16 (1507).

When thus feeding back reception quality information and transmit signal pre-coding information in a situation where a plurality of modes are simultaneously set, by granting an order of priority that is in accordance with the mode that the transmit signal pre-coder confirmation corresponds to, management as to which transmit signal pre-coding information was used with respect to which sub-band becomes easier. In addition, since feedback information that has become incongruent with the channel state with the passage of time from feedback is invalidated after a predetermined period, degradation in characteristics due to the use of such information can be prevented. It is noted that the time for invalidation may be defined in advance through specifications, etc., or a period that is set with respect to its own or another periodic feedback mode may be used. Further, one that is uniquely computable from this period may also be used. Further, this time may also be explicitly reported from the base station apparatus.

Seventh Embodiment

Figure 16:
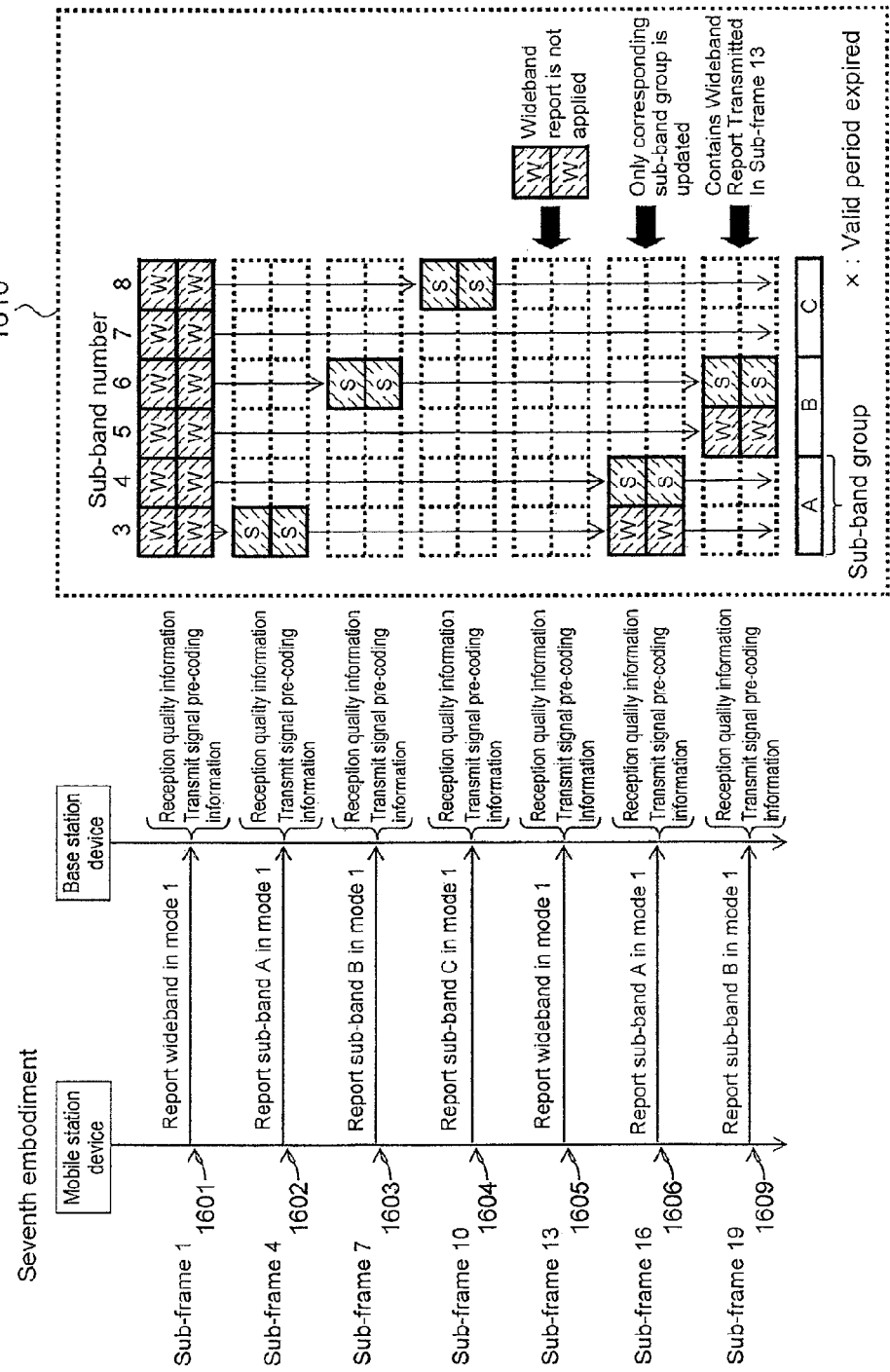
FIG. 16 is a diagram showing a sequence diagram illustrating the process flow between a base station apparatus and a mobile station apparatus of a mobile communication system according to a seventh embodiment of the present invention, and a table showing the status of application of transmit signal sequence number information to transmit signal pre-coder confirmation in each sub-frame.

FIG. 16 represents a sequence diagram illustrating the process flow between a base station apparatus and a mobile station apparatus of a mobile communication system according to the present embodiment, and a table (1610) showing the status of application of transmit signal sequence number information to transmit signal pre-coder confirmation in each sub-frame. This diagram illustrates what kind of criteria (priority) the plurality of transmit signal sequence number information transmitted from the mobile station apparatus is applied to transmit signal pre-coder confirmation with. As for the feedback of reception quality information and transmit signal pre-coding information in the present embodiment, feedback of reception quality information and transmit signal pre-coding information by the method of mode 1 shown in FIG. 13 is performed.

It differs from the sixth embodiment in that it describes application of single transmit signal pre-coding information in mode 1. Specifically, the operations in sub-frames 13, 16 and 19 are characteristic. Although wideband reception quality information and transmit signal pre-coding information are received in sub-frame 13, if this were to overwrite and be applied to all sub-bands, the last sub-band transmit signal pre-coding information for sub-band 8 that was received in sub-frame 7 would be overwritten, too. As this operation is inefficient, overwriting application with respect to all sub-bands is not performed in sub-frame 13 (1605). In other words, the sub-band transmit signal pre-coding information has its priority set higher than the wideband transmit signal pre-coding information. Further, when feedback with respect to sub-band group A is performed in sub-frame 16, all transmit signal pre-coding information for that sub-band group A is updated (1606).

Specifically, with respect to sub-band 4 for which sub-band transmit signal pre-coding information has been transmitted, the transmitted transmit signal pre-coding information is applied, and for the other sub-band (3), the wideband transmit signal pre-coding information transmitted in sub-frame 10 is applied. These operations similarly apply to sub-frame 19 as well (1606).

When thus feeding back reception quality information and transmit signal pre-coding information by dividing the frequency domain to be fed back by time, it is possible to prevent overwriting application by wideband transmit signal pre-coding information immediately after feedback by performing application per divided frequency domain at the time when feedback for that domain is performed.

Eighth Embodiment

Figure 17:
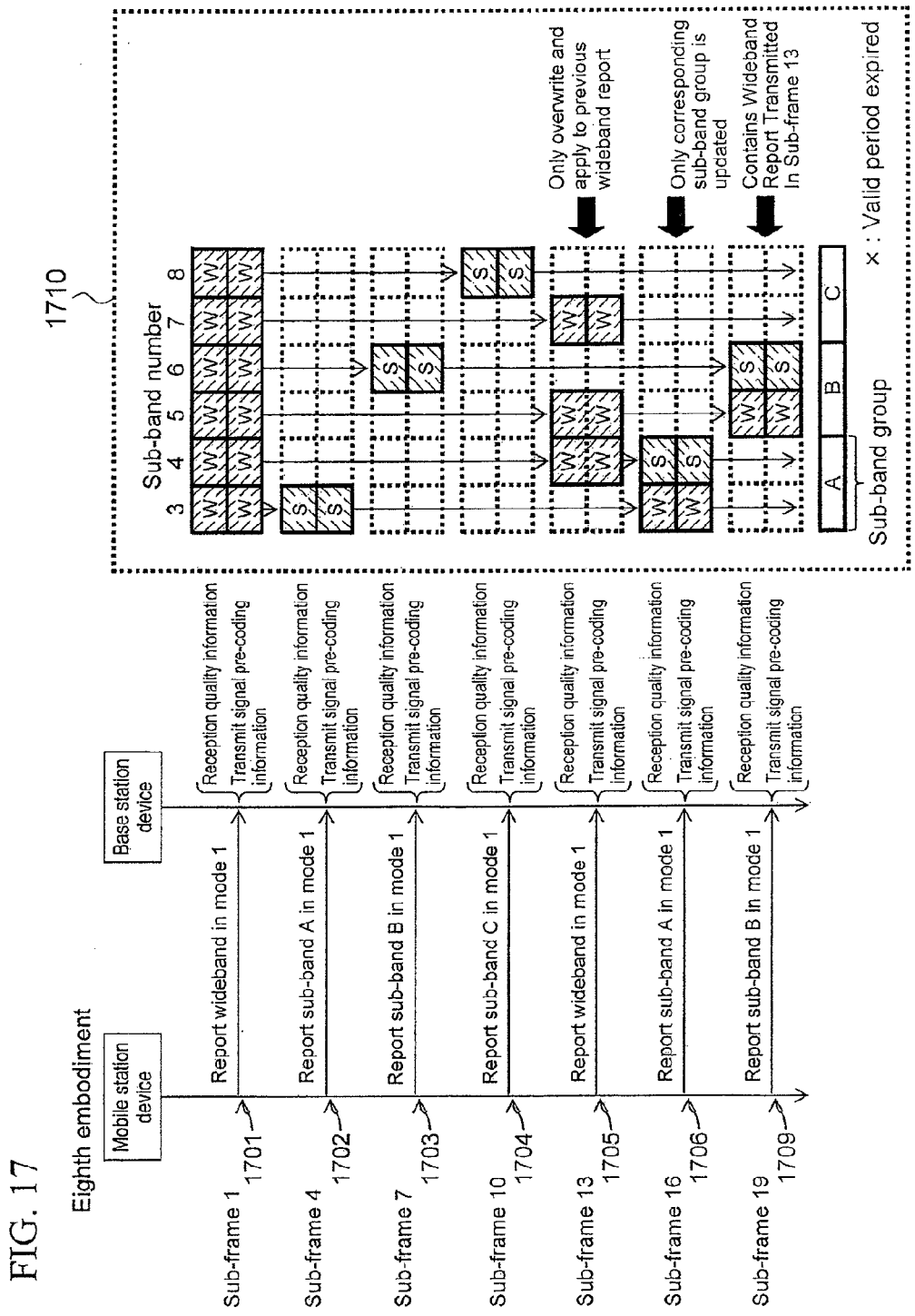
FIG. 17 is a diagram showing a sequence diagram illustrating the process flow between a base station apparatus and a mobile station apparatus of a mobile communication system according to an eighth embodiment of the present invention, and a table showing the status of application of transmit signal sequence number information to transmit signal pre-coder confirmation in each sub-frame.

FIG. 17 is a diagram showing a sequence diagram illustrating the process flow between a base station apparatus and a mobile station apparatus of a mobile communication system according to the present embodiment, and a table (1710) showing the status of application of transmit signal sequence number information to transmit signal pre-coder confirmation in each sub-frame. This diagram illustrates what kind of criteria (priority) the plurality of transmit signal sequence number information transmitted from the mobile station apparatus is applied to transmit signal pre-coder confirmation with. As for the feedback of reception quality information and transmit signal pre-coding information in the present embodiment, feedback of reception quality information and transmit signal information by the method of mode 1 shown in FIG. 13 is performed.

It differs from the seventh embodiment in that it describes application of single transmit signal pre-coding information in mode 1. Specifically, the operations in sub-frames 13 are characteristic. Although wideband reception quality information and transmit signal pre-coding information are received in sub-frame 13, if this were to overwrite and be applied to all sub-bands, the last sub-band transmit signal pre-coding information for sub-band 8 that was received in sub-frame 7 would be overwritten, too. Further, with respect to each sub-band group, it is unfavorable that this information cannot be applied until the next feedback is performed.

As such, in sub-frame 13, overwriting application is performed only with respect to the sub-bands for which wideband transmit signal pre-coding information is applied. Specifically, with respect to sub-bands 4, 5 and 7, the wideband transmit signal pre-coding information that was fed back in sub-frame 1 is updated to the wideband transmit signal pre-coding information that is fed back in sub-frame 13 (1705). In other words, the sub-band transmit signal pre-coding information has its priority set higher than the wideband transmit signal pre-coding information.

When thus feeding back reception quality information and transmit signal pre-coding information by dividing the frequency domain to be fed back by time, it is possible to prevent overwriting application by wideband transmit signal pre-coding information immediately after feedback by performing application per divided frequency domain at the time when feedback for that domain is performed.

Various embodiments of the present invention have been described above in detail with reference to the drawings. However, the specific configuration is by no means limited to the embodiments provided above, and designs, etc., made within scopes that do not depart from the spirit of the present invention are included in the scope of the claims.

INDUSTRIAL APPLICABILITY

The present invention is applicable to communication apparatus.

The invention claimed is:

1. A mobile station apparatus in a mobile communication system comprising a base station apparatus and the mobile station apparatus, the mobile station apparatus comprising:
a transmission unit configured to transmit periodically, to the base station apparatus, a first pre-coding indicator using a periodic feedback scheme that uses a physical uplink control channel,
the transmission unit being further configured to transmit, to the base station apparatus, second pre-coding indicators using an aperiodic feedback scheme that uses a physical uplink shared channel; and
a reception unit configured to receive, from the base station apparatus, a downlink signal and a pre-coder confirmation, the downlink signal having been pre-coded using pre-coding information indicated by the transmitted pre-coding indicators, the pre-coder confirmation indicating whether the pre-coding information having been used to pre-code the downlink signal is indicated by the second pre-coding indicators transmitted using the aperiodic feedback scheme that uses the physical uplink shared channel.

2. The mobile station apparatus according to claim 1, wherein the reception unit is further configured to receive from the base station apparatus, information designating the aperiodic feedback scheme that uses the physical uplink shared channel.

3. A method of using a mobile station apparatus in a mobile communication system comprising a base station apparatus and the mobile station apparatus, the method comprising:
periodically transmitting to the base station apparatus a first pre-coding indicator using a periodic feedback scheme that uses a physical uplink control channel,
transmitting, to the base station apparatus, second pre-coding indicators using an aperiodic feedback scheme that uses a physical uplink shared channel; and
receiving, from the base station apparatus, a downlink signal and a pre-coder confirmation, the downlink signal having been pr-coded using pre-coding information indicated by the transmitted pre-coding indicators, the pre-coder confirmation indicating whether the pre-coding information having been used to pre-code the downlink signal is indicated by the second pre-coding indicators transmitted using the aperiodic feedback scheme that uses the physical uplink shared channel.

4. The method according to claim 3, further comprising:
receiving, from the base station apparatus, information designating the aperiodic feedback scheme to be used in transmitting the second pre-coding indicators via the physical uplink shared channel.

* * * * *